(12) United States Patent
Kim

(10) Patent No.: US 12,501,135 B2
(45) Date of Patent: Dec. 16, 2025

(54) OPTICAL SYSTEM AND CAMERA MODULE INCLUDING THE SAME

(71) Applicant: LG INNOTEK CO., LTD., Seoul (KR)

(72) Inventor: Ji Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 643 days.

(21) Appl. No.: 17/420,648

(22) PCT Filed: Dec. 30, 2019

(86) PCT No.: PCT/KR2019/018696
§ 371 (c)(1),
(2) Date: Jul. 2, 2021

(87) PCT Pub. No.: WO2020/141827
PCT Pub. Date: Jul. 9, 2020

(65) Prior Publication Data
US 2022/0086318 A1    Mar. 17, 2022

(30) Foreign Application Priority Data

Jan. 4, 2019  (KR) .................. 10-2019-0001216

(51) Int. Cl.
*H04N 23/55* (2023.01)
*G02B 9/34* (2006.01)
*G02B 13/00* (2006.01)
*G03B 17/12* (2021.01)

(52) U.S. Cl.
CPC ............. *H04N 23/55* (2023.01); *G02B 9/34* (2013.01); *G02B 13/004* (2013.01); *G03B 17/12* (2013.01)

(58) Field of Classification Search
CPC ........ H04N 23/55; G02B 9/34; G02B 13/004; G02B 3/0037; G02B 7/02; G02B 7/021; G02B 5/20; G03B 17/12; G03B 30/00
See application file for complete search history.

(56) References Cited

U.S. PATENT DOCUMENTS

| 9,335,511 | B2* | 5/2016 | Jung ............... G02B 13/0045 |
| 10,481,365 | B2* | 11/2019 | Park ..................... G02B 9/62 |
| 2010/0020417 | A1 | 1/2010 | Lin | |
| 2014/0146401 | A1 | 5/2014 | Tsai et al. | |
| 2014/0184871 | A1 | 7/2014 | Chen et al. | |
| 2015/0241675 | A1* | 8/2015 | Sudoh ................ G02B 13/146 359/688 |
| 2016/0261844 | A1* | 9/2016 | Kadambi ............... G06T 7/507 |

(Continued)

FOREIGN PATENT DOCUMENTS

CN   102224431 A   10/2011
CN   104104941 A   10/2014
(Continued)

*Primary Examiner* — Twyler L Haskins
*Assistant Examiner* — John H Morehead, III
(74) *Attorney, Agent, or Firm* — Birch, Stewart, Kolasch & Birch, LLP

(57) ABSTRACT

An optical system according to one embodiment of the present invention includes a first lens, a second lens, a third lens, and a fourth lens, which are sequentially arranged from an object side to an image side, and has an F value of 1.7 or less and a ratio (total top length (TTL)/F value) of a TTL to the F value of 2.1 to 3.

18 Claims, 14 Drawing Sheets

← object side    image side →

100 : 110, 120, 130, 140

(56) References Cited

U.S. PATENT DOCUMENTS

| | | | |
|---|---|---|---|
| 2017/0235098 A1 | 8/2017 | Tsai et al. | |
| 2017/0293109 A1 | 10/2017 | Shi et al. | |
| 2018/0106979 A1 | 4/2018 | Chang et al. | |
| 2018/0172952 A1 | 6/2018 | Liu et al. | |
| 2019/0101724 A1 | 4/2019 | Chen et al. | |
| 2019/0129149 A1* | 5/2019 | Yao | H04N 23/55 |
| 2019/0204541 A1* | 7/2019 | Huang | G02B 9/34 |
| 2019/0258028 A1* | 8/2019 | Huang | H04N 23/55 |
| 2019/0361205 A1* | 11/2019 | Wolterink | G02B 13/0085 |

FOREIGN PATENT DOCUMENTS

| | | | |
|---|---|---|---|
| CN | 107807438 A | 3/2018 | |
| CN | 108152923 A | 6/2018 | |
| EP | 2 090 914 A1 | 8/2009 | |
| EP | 2 790 034 A1 | 10/2014 | |
| JP | 6-347694 A | 12/1994 | |
| JP | 8-166539 A | 6/1998 | |
| JP | 2004-354829 A | 12/2004 | |
| JP | 2007-322844 A | 12/2007 | |
| JP | 2009-300797 A | 12/2009 | |
| JP | 2015-138174 A | 7/2015 | |
| KR | 10-2017-0066005 A | 6/2017 | |
| TW | 201706667 A | 2/2017 | |
| TW | I634360 B | 9/2018 | |
| WO | WO 2016/190625 A1 | 12/2016 | |
| WO | WO 2018/163831 A1 | 9/2018 | |

\* cited by examiner

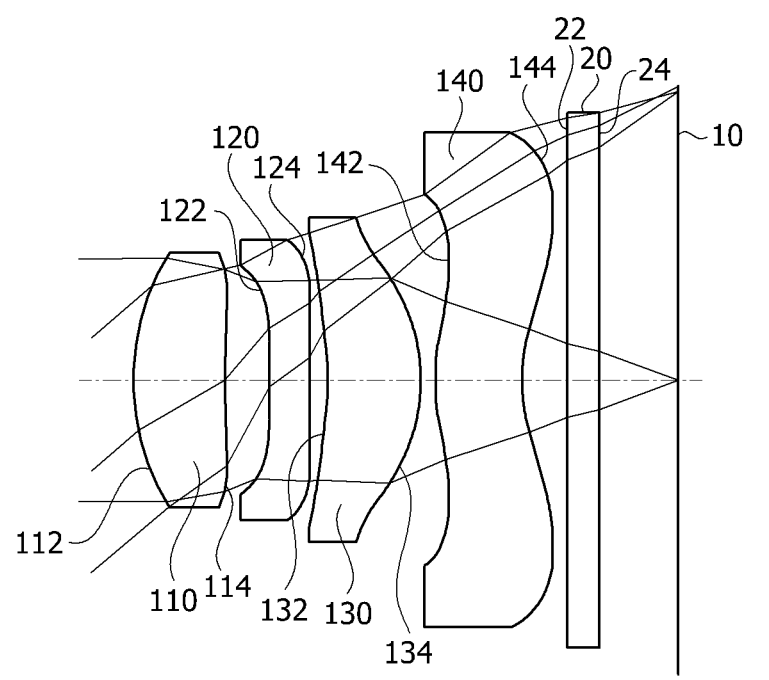
[FIG. 1]
← object side    image side →
100 : 110, 120, 130, 140

[FIG. 2]
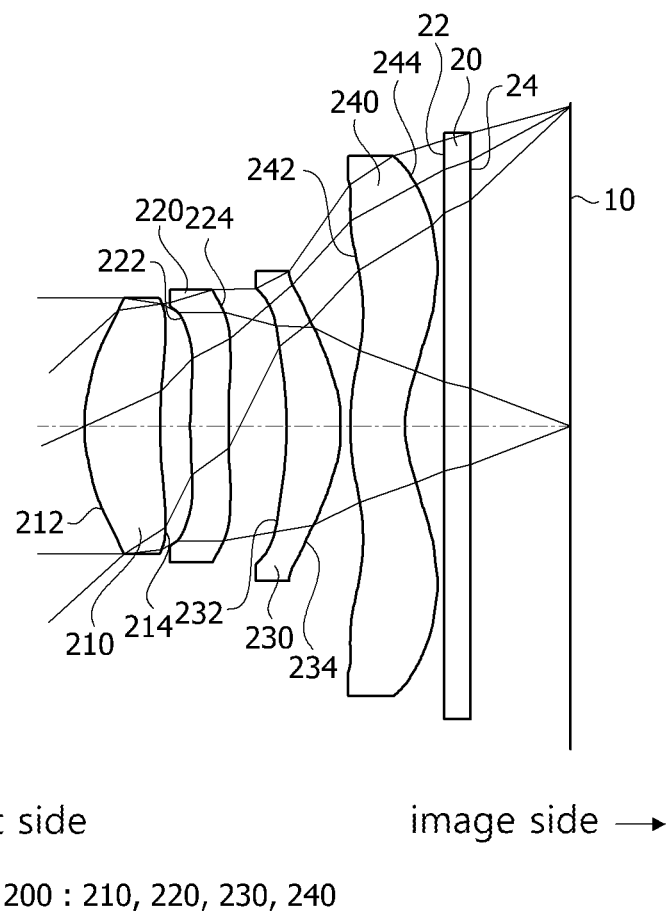
← object side        image side →
200 : 210, 220, 230, 240

[FIG. 3]
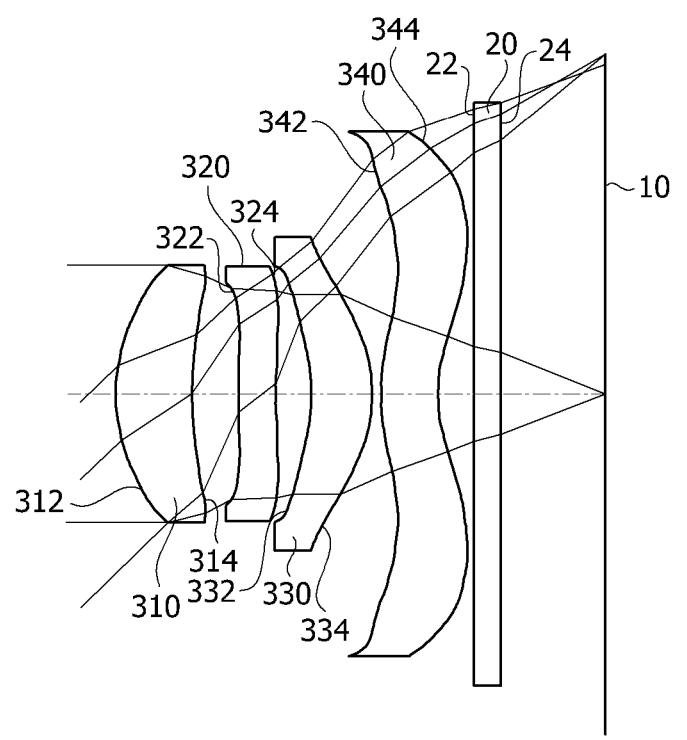
← object side          image side →
300 : 310, 320, 330, 340

[FIG. 4]
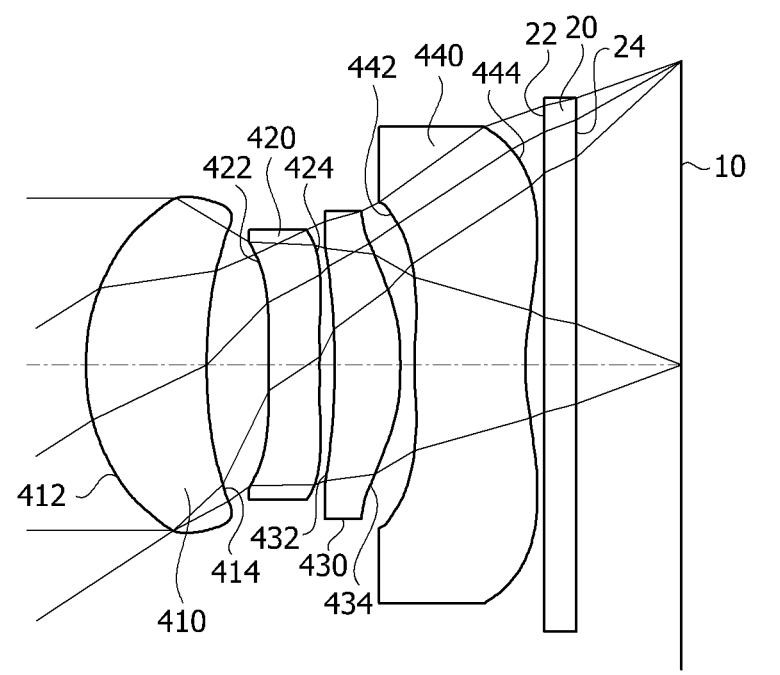
← object side    image side →
400 : 410, 420, 430, 440

[FIG. 5]
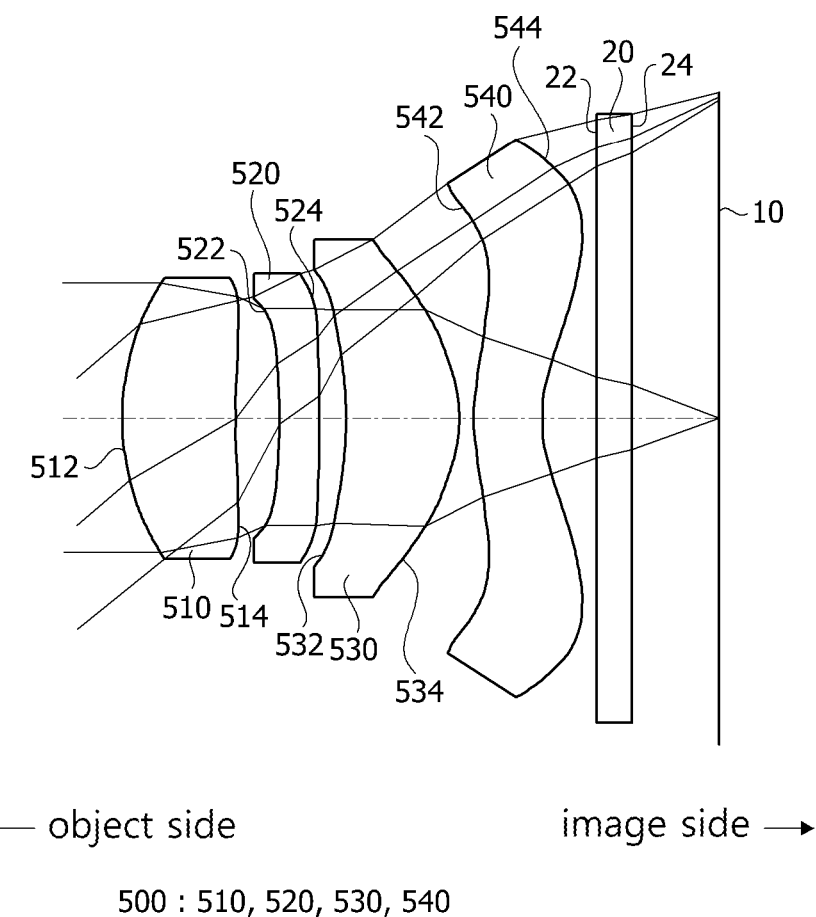
← object side    image side →
500 : 510, 520, 530, 540

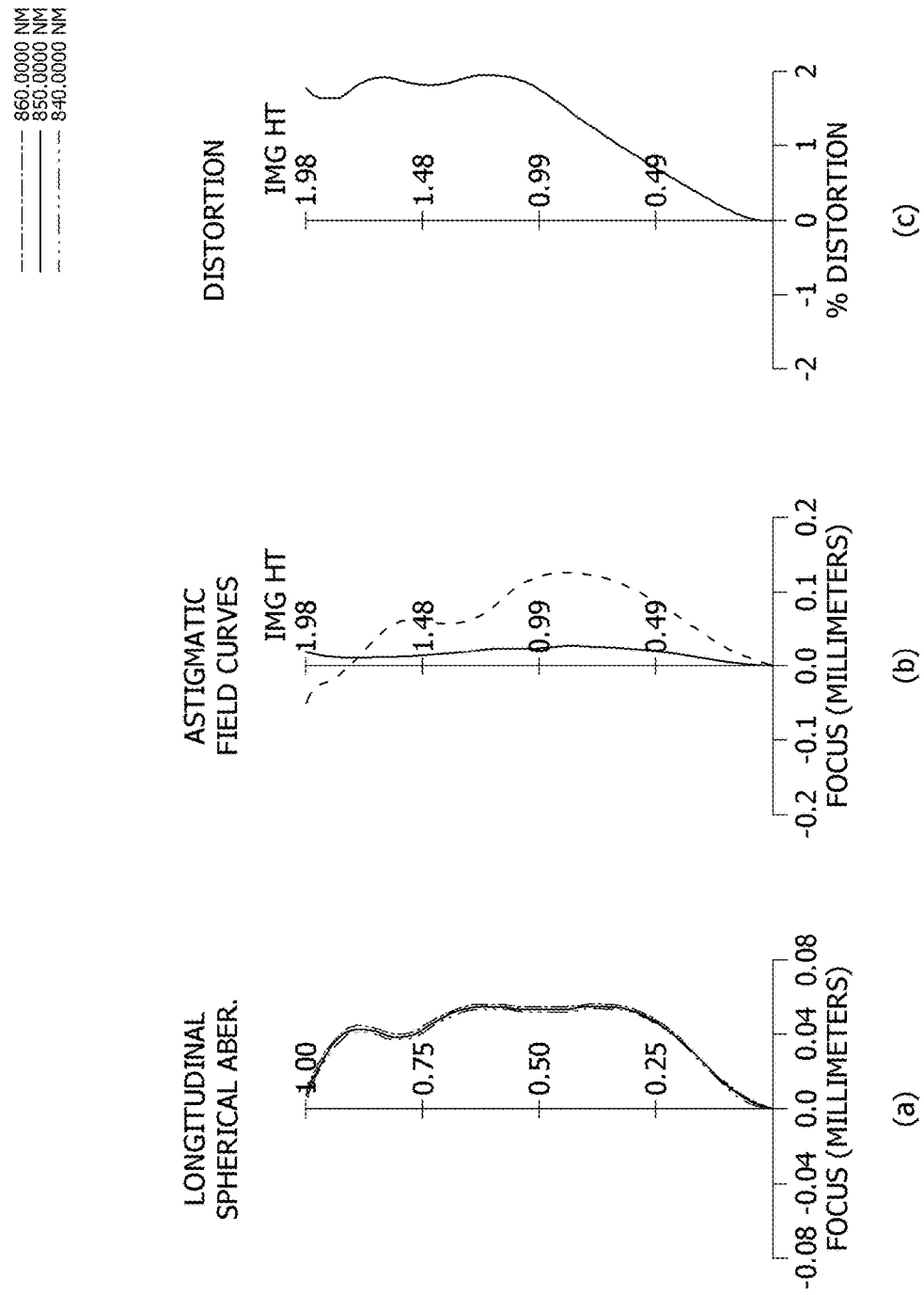

[FIG. 7]
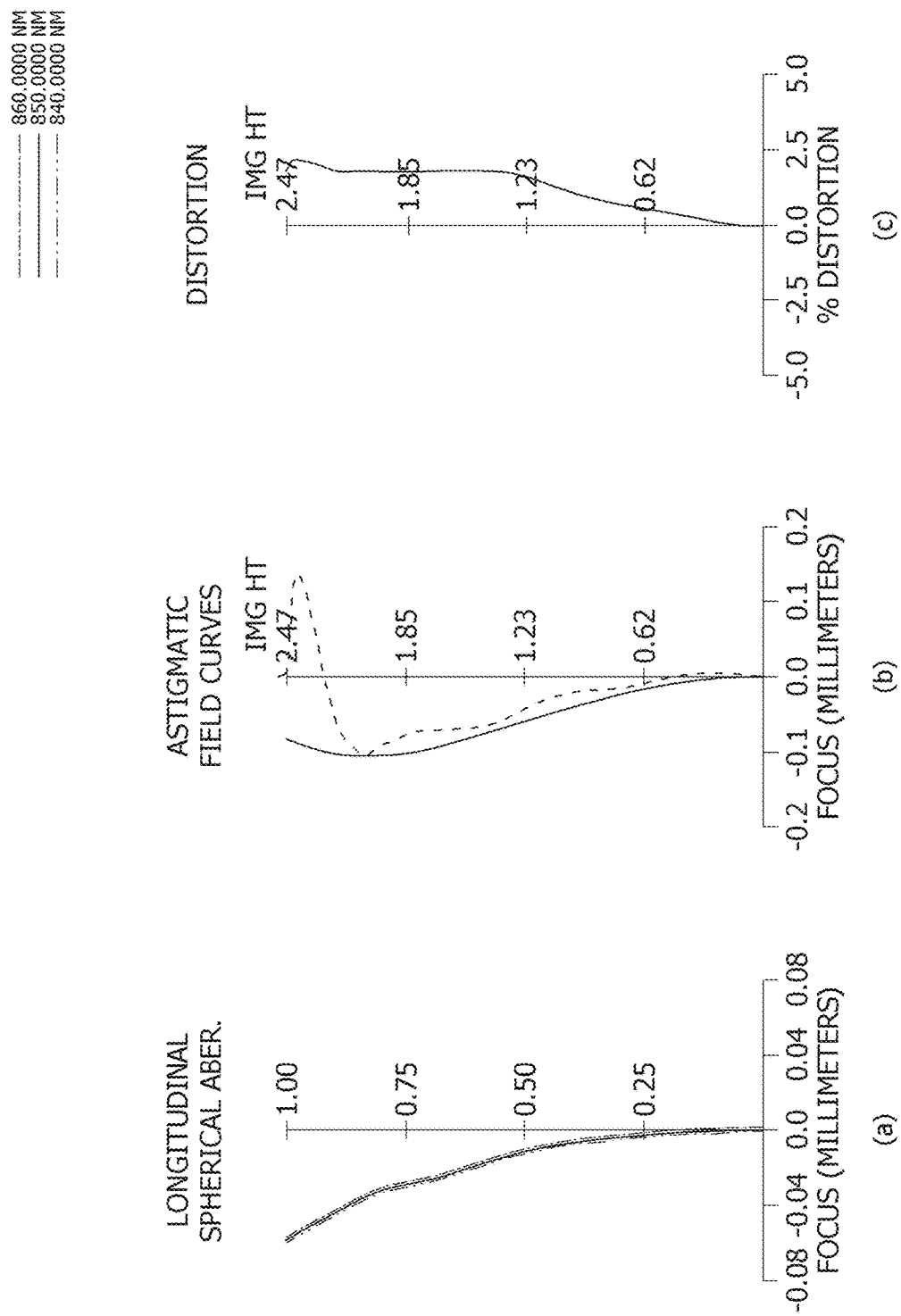

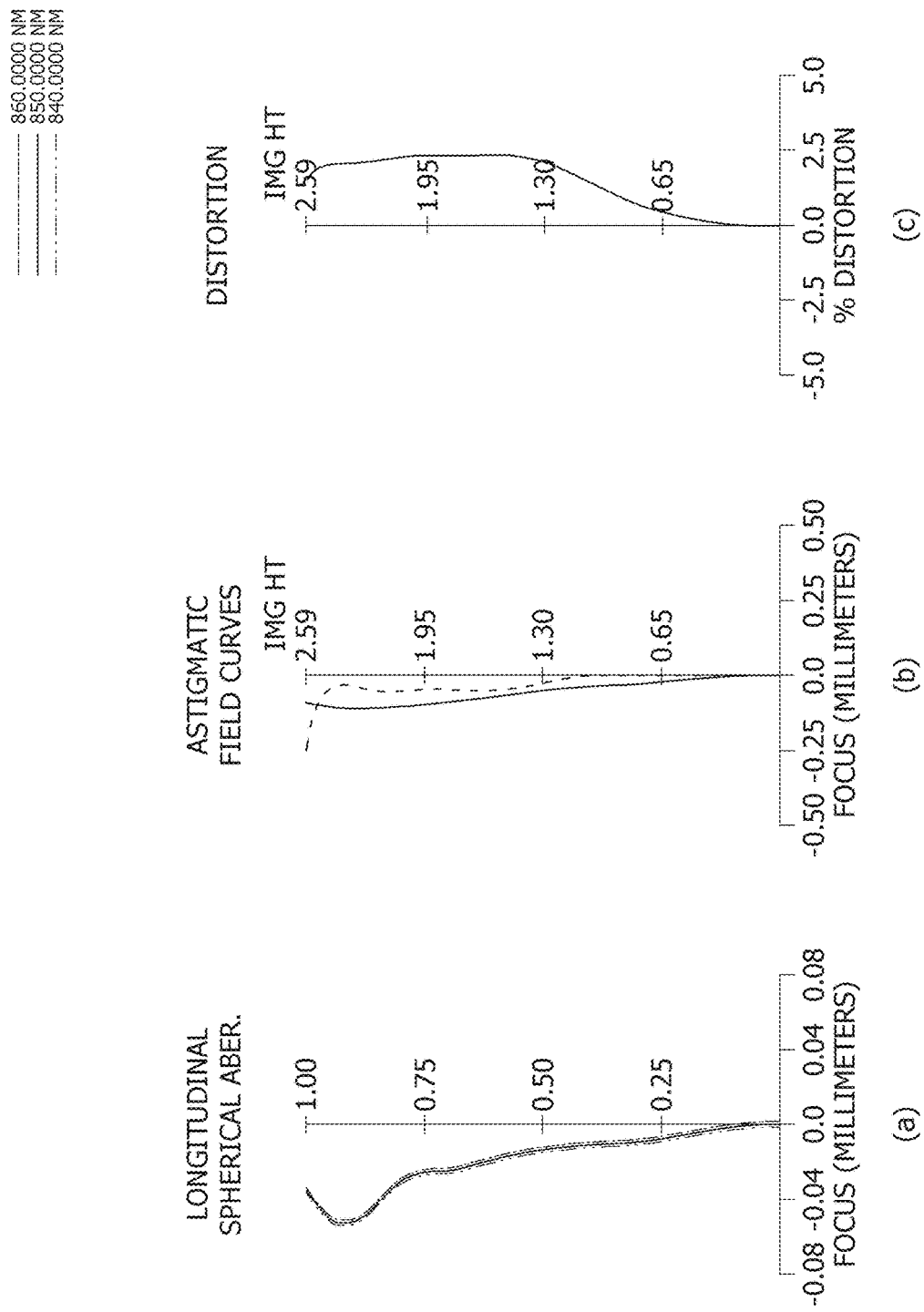

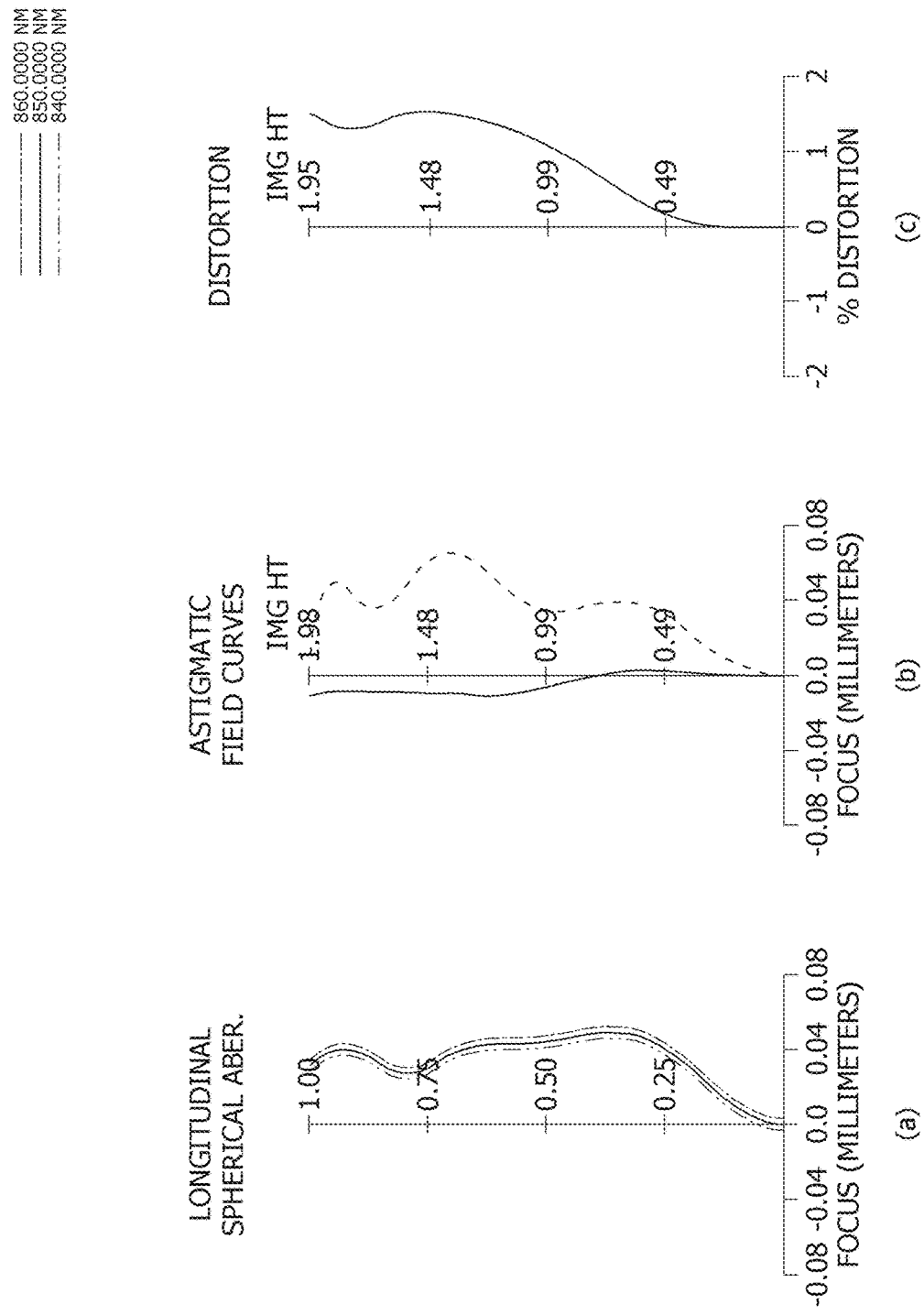

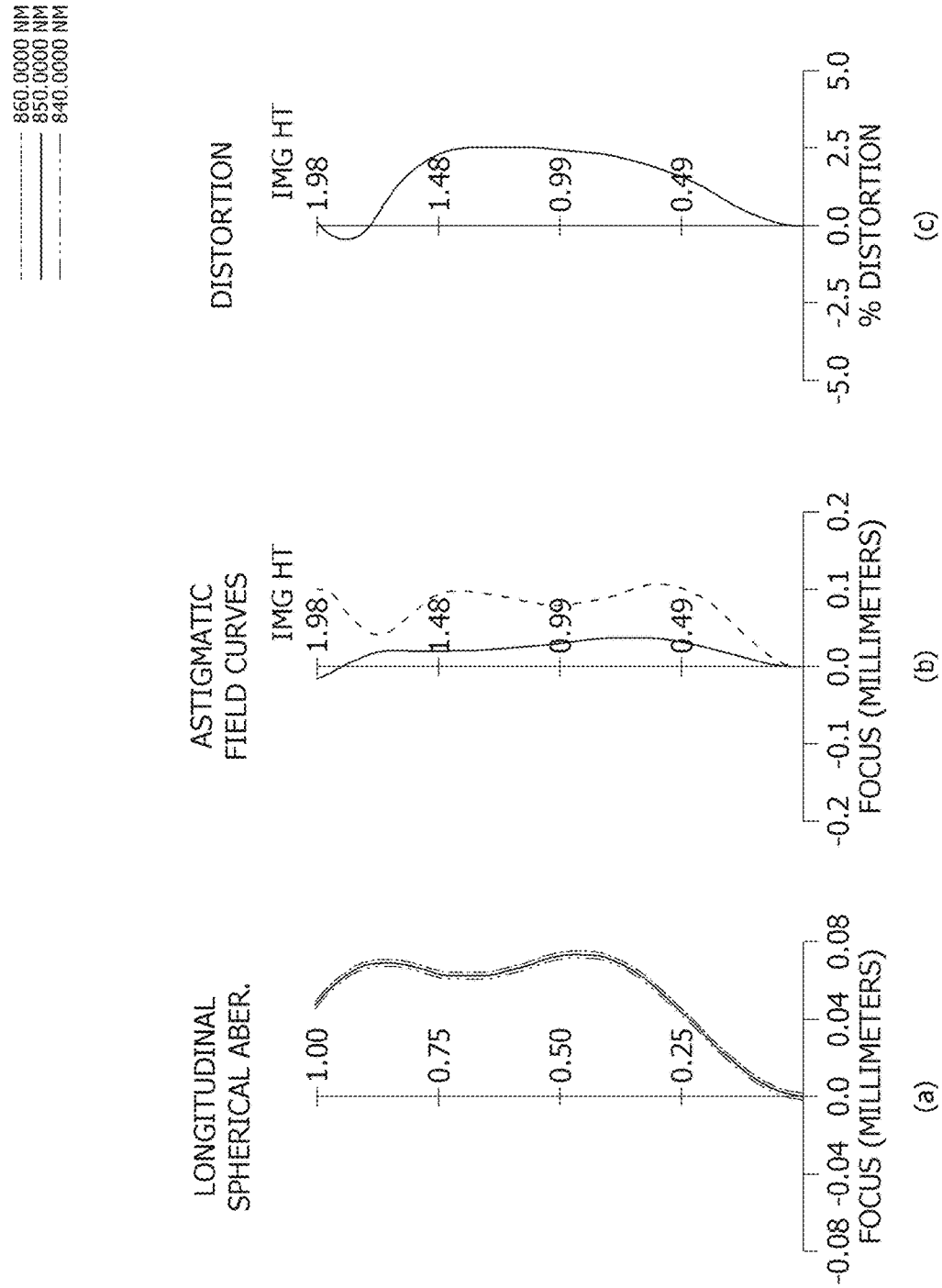
[FIG. 10]

[FIG. 11]
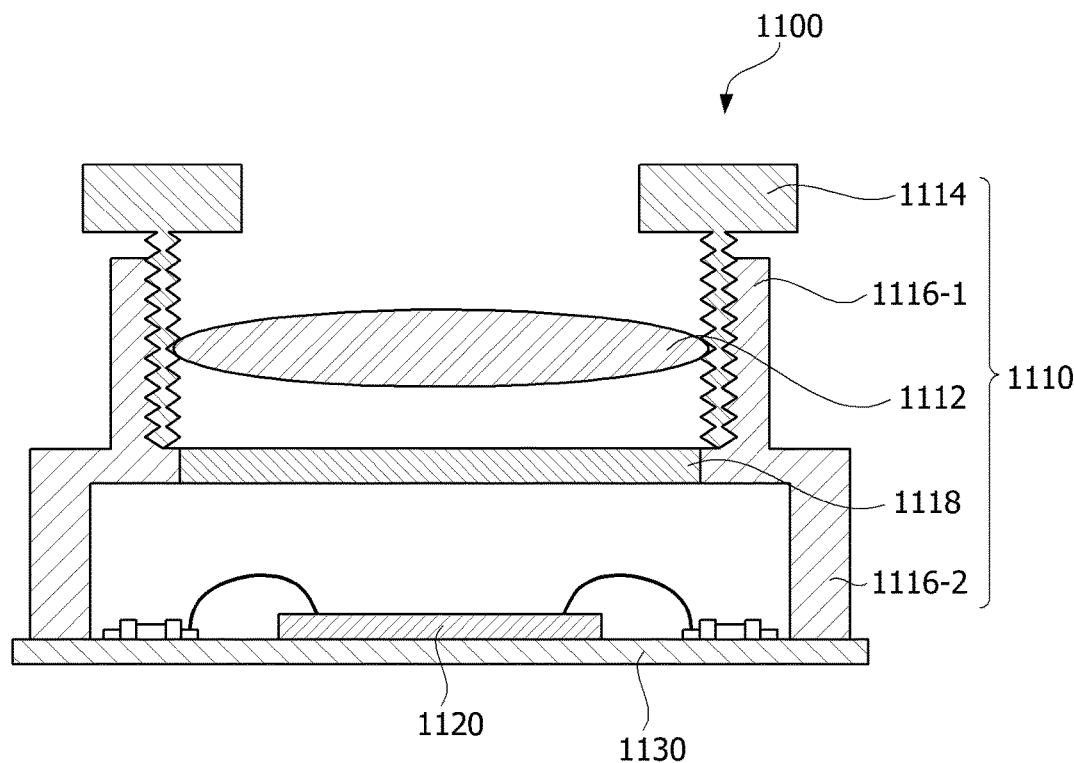
[FIG. 12]
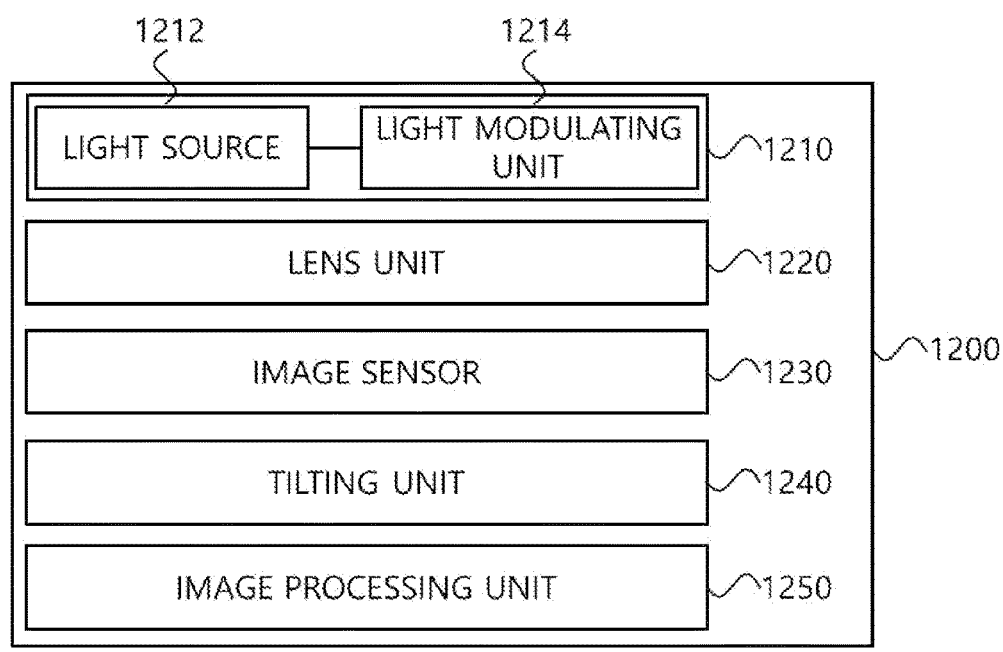

[FIG. 13]
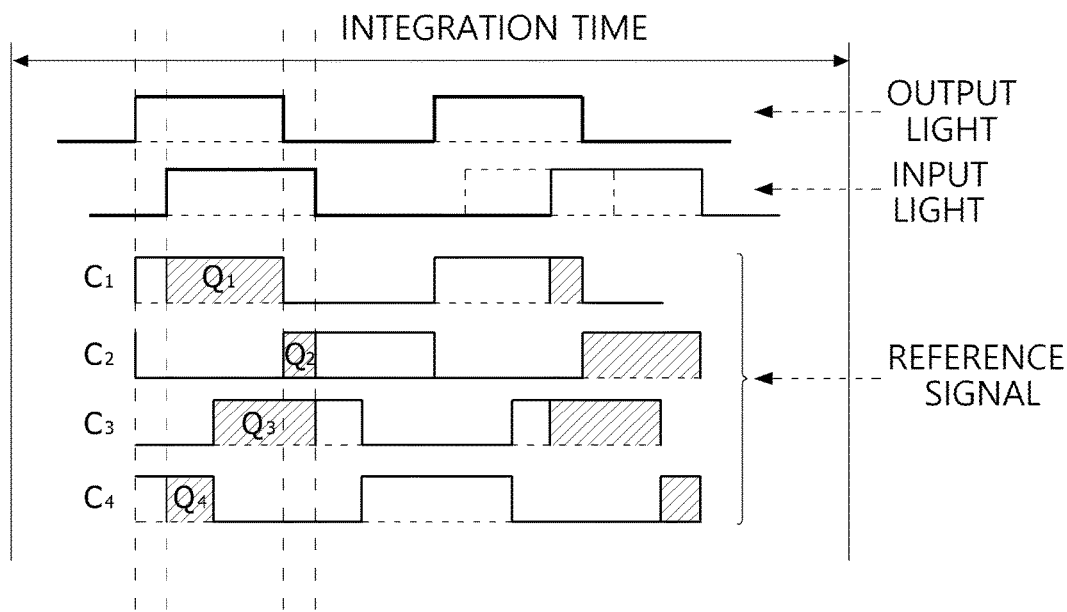
[FIG. 14]
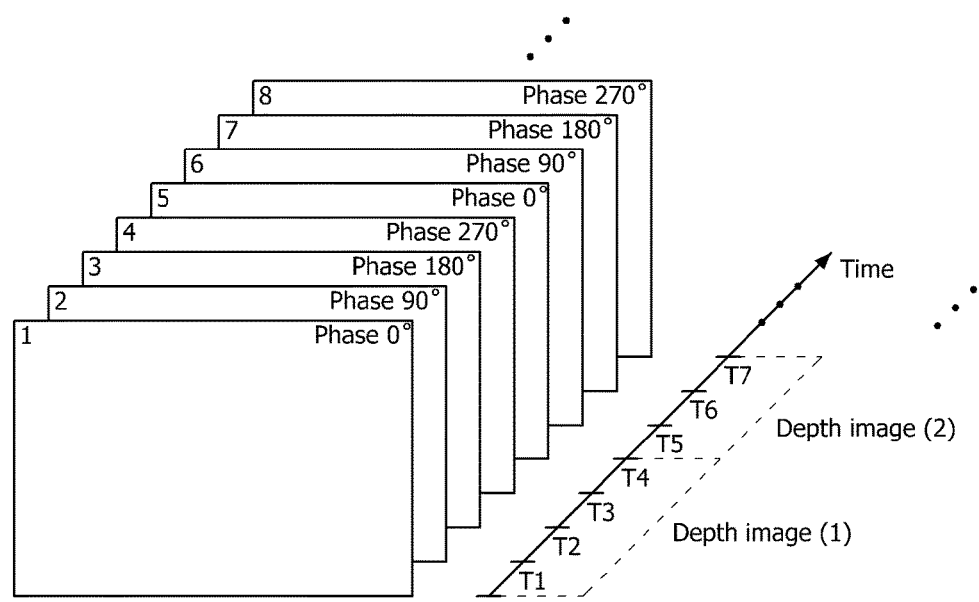

[FIG. 15A]
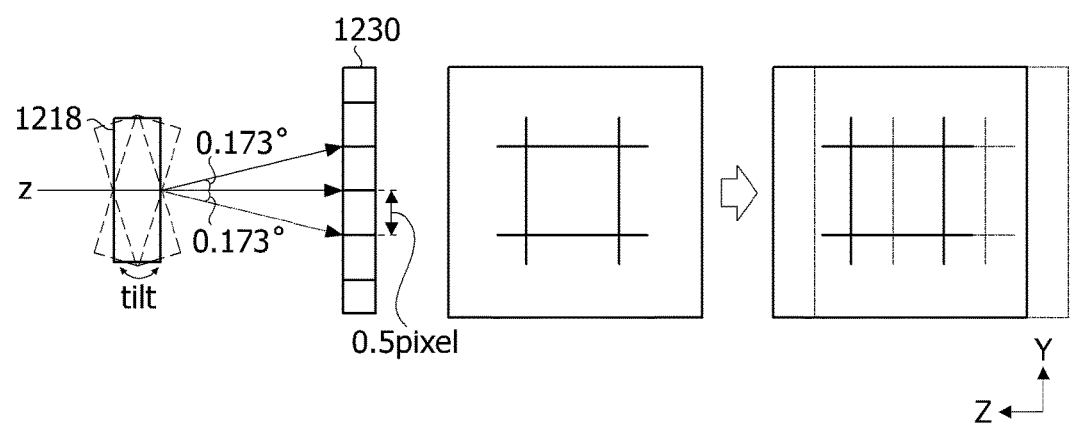

[FIG. 15B]
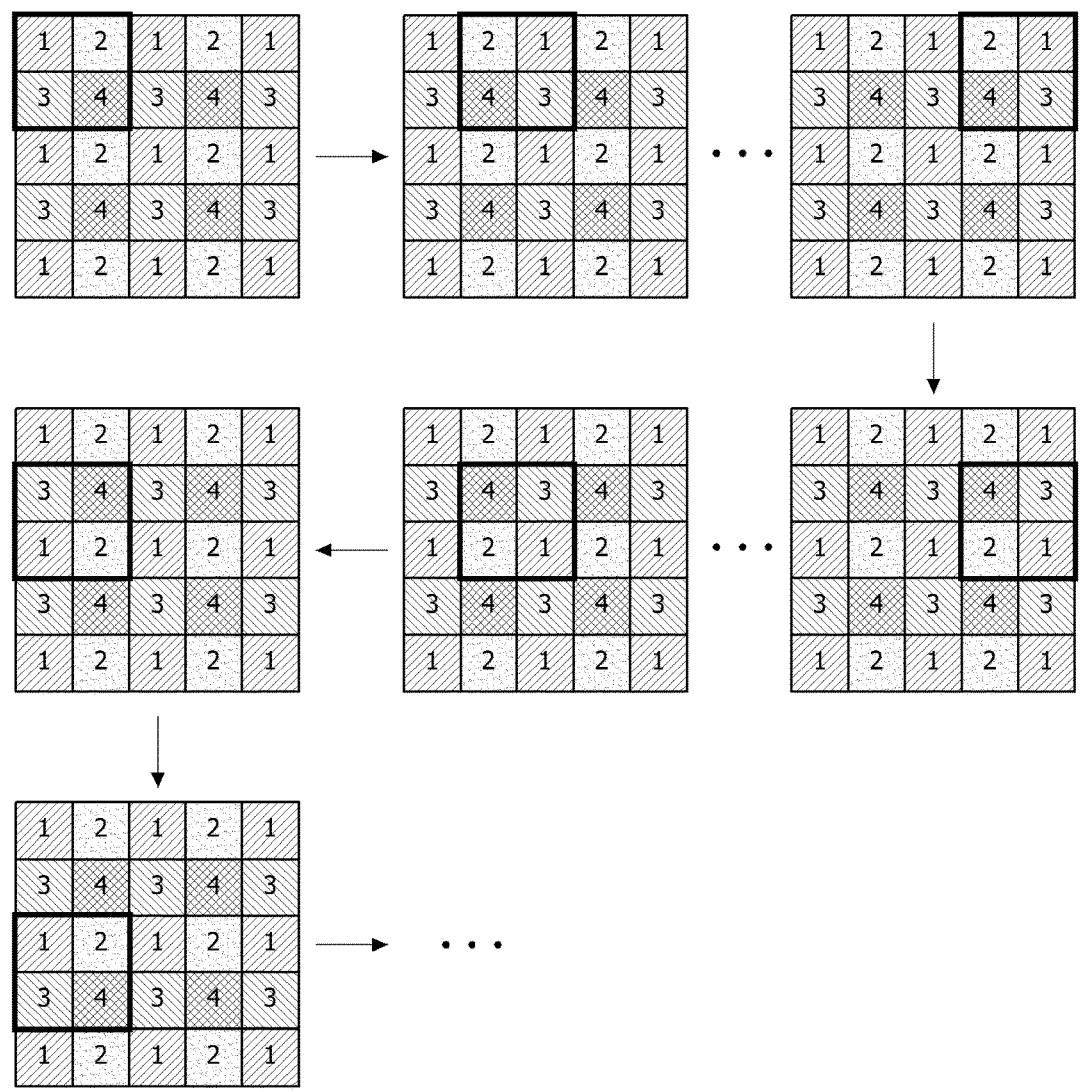

OPTICAL SYSTEM AND CAMERA MODULE INCLUDING THE SAME

CROSS REFERENCE TO RELATED APPLICATIONS

This application is the National Phase of PCT International Application No. PCT/KR2019/018696, filed on Dec. 30, 2019, which claims priority under 35 U.S.C. 119(a) to Patent Application No. 10-2019-0001216, filed in the Republic of Korea on Jan. 4, 2019, all of which are hereby expressly incorporated by reference into the present application.

TECHNICAL FIELD

The present invention relates to a camera module, and more particularly, to an optical system and a camera module including the same.

BACKGROUND ART

Three-dimensional (3D) contents have been applied to not only games and cultural fields but also a variety of fields such as education, manufacturing, autonomous driving, and the like, and a depth map is necessary for obtaining 3D contents. The depth map is information indicating a distance on space and indicates perspective information of another point with respect to one point in a two-dimensional (2D) image.

As a method of obtaining the depth map, a method of projecting infrared (IR) structured light toward an object, a method using a stereo camera, a time of flight (ToF) method, and the like have been used. According to the ToF method, a distance to an object is calculated by measuring the time of flight, that is, the time taken for light to be emitted and returned by being reflected. The biggest advantage of the ToF method is that a distance information (map) on a 3D space is quickly provided in real time. In addition, an accurate distance information (map) may be obtained even when a user does not apply a separate algorithm or perform a hardware correction. In addition, an accurate depth map may be obtained even when measuring a subject that is very close or measuring a moving subject.

Meanwhile, as the technology of a portable terminal and a camera embedded therein is developed, there is an attempt to embed a camera module having a ToF function even in the portable terminal, but due to the restriction of design in the portable terminal, it is difficult to obtain high-resolution optical performance while satisfying a small thickness, low power consumption, and light weight.

DISCLOSURE

Technical Problem

The present invention is directed to providing an optical system and a camera module including the same.

Technical Solution

One aspect of the present invention provides an optical system including a first lens, a second lens, a third lens, and a fourth lens, which are sequentially arranged from an object side to an image side, and having an F value of 1.7 or less and a ratio (total top length (TTL)/F value) of a TTL to the F value in a range of 2.1 to 3.

The first lens and the third lens may each have a positive power, and the fourth lens may have a negative power.

A ratio (F3/F1) of a focal length (F3) of the third lens to a focal length (F1) of the first lens may be in a range of 0.5 to 1.5.

The first lens may include a convex object-side surface and a concave image-side surface, the third lens may include a concave object-side surface and a convex image-side surface, and the fourth lens may include a convex object-side surface and a concave image-side surface.

The F value may be 1.5 or less, and the ratio (TTL/F value) of the TTL to the F value may be in a range of 2.4 to 3.

The F value may be 1.4 or less, and the ratio (TTL/F value) of the TTL to the F value may be in a range of 2.6 to 2.9.

Among a first distance between an image-side surface of the first lens and an object-side surface of the second lens, a second distance between an image-side surface of the second lens and an object-side surface of the third lens, and a third distance between an image-side surface of the third lens and an object-side surface of the fourth lens, the third distance may be the shortest.

Among a first refractive index of the first lens, a second refractive index of the second lens, a third refractive index of the third lens, and a fourth refractive index of the fourth lens, the third refractive index may be the highest.

At least one of an object-side surface and an image-side surface of the fourth lens may include at least one inflection point.

Another aspect of the present invention provides a camera module including an image sensor, a filter disposed above the image sensor, and an optical system disposed above the filter, wherein the optical system includes a first lens, a second lens, a third lens, and a fourth lens sequentially arranged from an object side to an image side, an F value is 1.7 or less, and a ratio (total top length (TTL)/F value) of a TTL to the F value is in a range of 2.1 to 3.

The camera module may include a light output unit configured to output light to an object, and an image processing unit configured to extract a depth map of the object using light that is output from the light output unit, reflected from the object, and received by the image sensor through the optical system and the filter, wherein the image processing unit extracts the depth map of the object using a phase difference between the light output from the light output unit and the light received by the image sensor.

The filter may be tilted with a predetermined rule, and a path of the light received by the image sensor may be shifted by the predetermined rule according to the tilting of the filter.

Advantageous Effects

According to an embodiment of the present invention, it is possible to provide an optical system and a camera module that can realize small size and high resolution even in a low-illuminance environment. The camera module according to the embodiment of the present invention can be applied to realize a time of flight (ToF) function.

DESCRIPTION OF DRAWINGS

FIG. 1 is a cross-sectional view of an optical system according to a first embodiment of the present invention.

FIG. 2 is a cross-sectional view of an optical system according to a second embodiment of the present invention.

FIG. 3 is a cross-sectional view of an optical system according to a third embodiment of the present invention.

FIG. 4 is a cross-sectional view of an optical system according to a fourth embodiment of the present invention.

FIG. 5 is a cross-sectional view of an optical system according to a fifth embodiment of the present invention.

FIGS. 6 to 10 are graphs each obtained by measuring longitudinal spherical aberration, astigmatic field curves, and distortion of each of the optical systems according to the first to fifth embodiments.

FIG. 11 is a cross-sectional view of a camera module to which the optical system according to one embodiment of the present invention is applied.

FIG. 12 illustrates a block diagram of the camera module that extracts a depth map according to one embodiment of the present invention.

FIG. 13 is a view for describing a process of generating electrical signals according to an embodiment of the present invention.

FIG. 14 is a simplified view of an example of a method of obtaining time of flight (ToF)-infrared (IR) images or depth images using four phase images.

FIG. 15A is a view for describing a light path of an input light signal changed by a tilting unit, and FIG. 15B is a view for describing the interpolation of input light data by moving a pixel in the unit of subpixels in an image sensor.

MODES OF THE INVENTION

Hereinafter, exemplary embodiments of the present invention will be described in detail with reference to the accompanying drawings.

However, the technical spirit of the present invention is not limited to embodiments to be disclosed below but may be realized in many different forms, and one or more elements of each of the embodiments may be selectively combined and substituted within the scope of the present invention.

In addition, unless clearly and expressly defined herein, the terms (including technical and scientific terms) used in the embodiments of the present invention have the same meaning as commonly understood by one of ordinary skill in the art to which the present invention belongs. It should be further understood that terms, such as those defined in commonly used dictionaries, should be interpreted as having a meaning that is consistent with their meaning in the context of the related art.

Further, the terms used in the embodiments of the present invention are provided only to describe embodiments of the present invention and not for purposes of limitation.

In the present specification, the singular forms include the plural forms unless the context clearly indicates otherwise, and the phrase "at least one element (or one or more elements) of an element A, an element B, and an element C," should be understood as including the meaning of at least one of all combinations being obtained by combining the element A, the element B, and the element C.

Further, in describing elements of the embodiments of the present invention, the terms such as first, second, A, B, (a), (b), and the like may be used.

These terms are merely for distinguishing one element from another element, and the property, order, sequence, and the like of corresponding elements are not limited by the terms.

In addition, it will be understood that when one element is referred to as being "connected" or "coupled" to another element, the element may not only be directly connected or coupled to another element but may also be connected or coupled to another element through the other element presented between one element and another element.

Further, when one element is referred to as being formed or disposed "on (above)" or "under (below)" another element, the terms "on (above)" or "under (below)" includes both of a case in which the two elements are in direct contact with each other or a case in which one or more elements are (indirectly) formed or disposed between the two elements. In addition, the term "on (above)" or "under (below)" includes a case in which another element is disposed in an upward direction or a downward direction with respect to one element.

An optical system according to an embodiment of the present invention includes a first lens, a second lens, a third lens, and a fourth lens that are sequentially arranged from an object side to an image side, and has an F value of 1.7 or less and a ratio (total top length (TTL)/F value) of a TTL to the F value of 2.1 to 3. In addition, the first lens and the third lens may each have a positive power, and the fourth lens may have a negative power. The power of each lens may be represented by the reciprocal of a focal length of each lens. Such an optical system may have excellent imaging performance, may correct chromatic aberration, and may also correct distortion well, even in a low-illuminance environment.

Meanwhile, the optical system according to the embodiment of the present invention may have a ratio (F3/F1) of a focal length F3 of the third lens to a focal length F1 of the first lens of 0.5 to 1.5. Accordingly, the optical system may be miniaturized, chromatic aberration may be well maintained, and distortion may be well corrected.

Further, in the optical system according to the embodiment of the present invention, among a first distance between an image-side surface of the first lens and an object-side surface of the second lens, a second distance between an image-side surface of the second lens and an object-side surface of the third lens, and a third distance between an image-side surface of the third lens and an object-side surface of the fourth lens, the third distance may be the shortest. The third distance is formed to be the shortest by designing the image-side surface of the third lens in a convex shape and the object-side surface of the fourth lens in a convex shape. Accordingly, the TTL of the optical system may be reduced and the resolution thereof may be improved. In addition, among a first refractive index of the first lens, a second refractive index of the second lens, a third refractive index of the third lens, and a fourth refractive index of the fourth lens, the third refractive index may be the highest. Accordingly, the sensitivity of the third lens may be reduced and thus the manufacturing tolerance may be increased when the third lens is manufactured.

FIG. 1 is a cross-sectional view of an optical system according to a first embodiment of the present invention. Table 1 illustrates optical characteristics of four lenses according to the first embodiment. In the first embodiment, a total effective focal length (EFL) is 2.2765 mm, a TTL is 3.7 mm, and an F value is 1.39. Tables 2 and 3 illustrate conic constants and aspheric coefficients for each lens constituting the optical system according to the first embodiment.

Referring to FIG. 1, an optical system 100 includes a first lens 110, a second lens 120, a third lens 130, and a fourth lens 140 that are sequentially arranged from an object side to an image side. A filter 20 may be disposed above an image sensor 10, and the optical system 100 may be disposed above the filter 20.

Light reflected from the object sequentially passes through the first to fourth lenses 110 to 140 of the optical system 100 and the filter 20 and is then received by the image sensor 10.

The filter 20 may be an infrared (IR) filter. The filter 20 may filter out near-IR (NIR) light, for example, light with a wavelength of 700 nm to 1100 nm, from light incident on the camera module. In addition, the image sensor 10 may be connected to a printed circuit board through wires.

The optical system 100 according to the first embodiment of the present invention has an F value of 1.7 or less, preferably 1.5 or less, and more preferably 1.4 or less, and has a ratio (TTL/F value) of a TTL to the F value of 2.1 to 3, preferably 2.4 to 3, and more preferably 2.6 to 2.9. For example, the optical system 100 according to the first embodiment may have an F value of 1.39, a TTL of 3.7, and a ratio (TTL/F value) of 2.66.

Here, the F value may refer to a ratio (F/D) of a focal length F of the lens to an effective diameter D of an aperture. Accordingly, the smaller the F value, the greater the diameter of the aperture and the diameter of the lens and the larger the amount of light collected. On the contrary, the greater the F value, the smaller the diameter of the aperture and the diameter of the lens and the smaller the amount of light collected.

The TTL refers to a distance from the image sensor 10 on which an image is formed to the first surface of the optical system 100. Here, the TTL may refer to a distance from the image sensor 10 on which the image is formed to an object-side surface 112 of the first lens 110.

When the ratio (TTL/F value) is less than 2.1, the optical system may be difficult to configure or may be degraded in performance and thus may be difficult to apply in a low-illuminance environment, and when the ratio (TTL/F value) exceeds 3, the optical system may be difficult to apply to a portable terminal due to an increase in size.

In the optical system 100 according to the first embodiment of the present invention, the first lens 110 has a positive (+) power. Accordingly, the first lens 110 may provide a part of the refractive power required by the optical system 100. The object-side surface 112 of the first lens 110 may be convex and an image-side surface 114 thereof may be concave. That is, the first lens 110 may have a meniscus shape. When the object-side surface 112 of the first lens 110 is convex, the refractive power of the first lens 110 may be enhanced. Although the first lens 110 may also have a biconvex shape in which the object-side surface 112 and the image-side surface 114 are convex, when the image-side surface 114 of the first lens 110 is concave, the dispersion force of light may be increased to improve resolution.

In the optical system 100 according to the first embodiment of the present invention, the second lens 120 may have a negative (−) power, an object-side surface 122 of the second lens 120 may be concave, and an image-side surface 124 of the second lens 120 may be concave. As described above, the second lens 120 may have a biconcave shape.

In the optical system 100 according to the first embodiment of the present invention, the third lens 130 may have a positive (+) power, an object-side surface 132 of the third lens 130 may be concave, and an image-side surface 134 of the third lens 130 may be convex. As described above, the third lens 130 may have a meniscus shape, and at least one of the object-side surface 132 and the image-side surface 134 of the third lens 130 may include at least one inflection point. Here, the thickness of the third lens 130 may be greater than the thickness of the second lens 120.

In the optical system 100 according to the first embodiment of the present invention, the fourth lens 140 may have a negative (−) power, an object-side surface 142 of the fourth lens 140 may be convex, and an image-side surface 144 of the fourth lens 140 may be concave. In addition, in the fourth lens 140, the absolute value of a radius of curvature of the object-side surface 142 may be greater than the absolute value of a radius of curvature of the image-side surface 144. Here, at least one of the object-side surface 142 and the image-side surface 144 of the fourth lens 140 may include at least one inflection point at a position other than the intersection with an optical axis. Here, the inflection point refers to a point on an aspherical surface in which a tangent plane of an aspherical vertex is perpendicular to an optical axis in a curve of a lens cross-sectional shape within an effective radius. Accordingly, the maximum emergence angle of key light received by the image sensor 10 may be adjusted so that a phenomenon in which a peripheral portion of a screen is darkened may be prevented.

At least one of the first to fourth lenses 110 to 140 may be made of a plastic material. Accordingly, the optical system that is lightweight and inexpensive to manufacture may be realized.

Meanwhile, an aperture (not shown) may be further disposed between the first lens 110 and the second lens 120. The aperture is provided to control a focal length by selectively receiving incident light.

Here, a focal length F1 of the first lens 110 may be in a range of 0.5 mm to 10 mm. When the focal length F1 of the first lens 110 is less than 0.5 mm, it may be difficult to manufacture the lens due to the increased lens sensitivity, and when the focal length F1 of the first lens 110 exceeds 10 mm, it may be difficult to correct aberration due to lack of lens refractivity. In addition, the absolute value of a focal length of the third lens 130 may be greater than the absolute value of a focal length of the second lens 120. When the absolute value of the focal length of the third lens 130 is equal to or less than the absolute value of the focal length of the second lens 120, the ratio of lens refractivity may not be maintained, and thus it may be difficult to adjust resolution.

A ratio (F3/F1) of a focal length F3 of the third lens 130 to the focal length F1 of the first lens 110 may be in a range of 0.5 to 1.5. For example, in the first embodiment, the ratio (F3/F1) of the focal length F3 of the third lens 130 to the focal length F1 of the first lens 110 may be 1.08. When the ratio (F3/F1) of the focal length F3 of the third lens 130 to the focal length F1 of the first lens 110 is less than 0.5, the overall size of the optical system 100 may be increased, and when the ratio (F3/F1) exceeds 1.5, resolution may be lowered.

Further, when a distance between the image-side surface 114 of the first lens 110 and the object-side surface 122 of the second lens 120 is referred to as a first distance, when a distance between the image-side surface 124 of the second lens 120 and the object-side surface 132 of the third lens 130 is referred to as a second distance, and when a distance between the image-side surface 134 of the third lens 130 and the object-side surface 142 of the fourth lens 140 is referred to as a third distance, the third distance may be less than 0.2 mm, and the third distance among the first distance, the second distance, and the third distance may be the shortest. That is, referring to Table 1, the third distance is 0.1 mm and may be less than the first distance and the second distance.

Further, among a first refractive index of the first lens 110, a second refractive index of the second lens 120, a third refractive index of the third lens 130, and a fourth refractive index of the fourth lens 140, the third refractive index may be the highest. That is, referring to Table 1, it may be seen that an index constant of the third lens 130 is 1.661 and the third lens 130 has the highest refractive index together with the fourth lens 140.

system according to the second embodiment. Duplicate descriptions of the same contents as those of the first embodiment described with reference to FIG. 1 will be omitted.

TABLE 1

| Lens No. | Lens surface No. | Radius of curvature R (mm) | Thickness (mm) | Index constant | Abbe number Vd | Focal length |
|---|---|---|---|---|---|---|
| First lens | 112 | 1.588613865 | 0.620156042 | 1.5442 | 56 | 3.490235657 |
|  | 114 | 9.036743888 | 0.304595889 |  |  |  |
| Second lens | 122 | −40.51799011 | 0.27 | 1.5442 | 56 | −39.31069672 |
|  | 124 | 44.11074414 | 0.124716558 |  |  |  |
| Third lens | 132 | −1.912521204 | 0.62994179 | 1.661 | 20.1 | 3.781541199 |
|  | 134 | −1.203299896 | 0.1 |  |  |  |
| Fourth lens | 142 | 1.6492897 | 0.590272021 | 1.661 | 20.1 | −22.12409968 |
|  | 144 | 1.270877926 | 0.3093177 |  |  |  |
| Filter | 22 | 1.00E+18 | 0.21 | Filter |  |  |
|  | 24 | 1.00E+18 |  |  |  |  |
| Image Sensor | 10 | 1.00E+18 | 0.54 | Image Sensor |  |  |

Here, the thickness (mm) represents the distance from each lens surface to a lens surface next to each lens surface. That is, the thickness described on the object-side surface 112 of the first lens 110 represents the distance from the object-side surface 112 to the image-side surface 114 of the first lens 110. In addition, the thickness described on the image-side surface 114 of the first lens 110 represents the distance from the image-side surface 114 of the first lens 110 to the object-side surface 122 of the second lens 120.

The index constant refers to the refractive index of the lens measured using a d-line.

TABLE 2

| Lens surface No. | Conic constant K | A | B | C | D |
|---|---|---|---|---|---|
| 112 | −19.2614 | 0.476342 | −0.57989 | −0.76699 | 4.202803 |
| 114 | 9.391511 | −0.03418 | −0.12855 | 0.558849 | −1.6958 |
| 122 | 777.5035 | −0.24025 | −0.19134 | −1.53439 | 3.43385 |
| 124 | 175.234 | 0.289021 | −1.20887 | 1.962692 | −2.82352 |
| 132 | 1.88596 | 0.453127 | −0.41221 | −0.1444 | 0.281656 |
| 134 | −0.57991 | 0.027643 | −0.31419 | 0.729878 | −0.72109 |
| 142 | −3.1718 | −0.20625 | 0.02863 | −0.14416 | 0.309167 |
| 144 | −0.49174 | −0.27633 | 0.061103 | −0.02347 | 0.014383 |

TABLE 3

| Lens surface No. | E | F | G | H | J |
|---|---|---|---|---|---|
| 112 | −4.2386 | −1.90615 | 1.531808 | 6.598255 | −5.48295 |
| 114 | 0.822788 | 3.5607 | −6.15273 | 2.833881 | −0.08944 |
| 122 | −2.66624 | −0.01997 | −3.03678 | 4.414354 | 0.171669 |
| 124 | 2.736252 | −0.9793 | −1.68284 | 2.419841 | −0.95355 |
| 132 | 1.808093 | −3.58015 | 1.734831 | 0.728386 | −0.64042 |
| 134 | 0.031112 | 0.649824 | −0.22909 | −0.25381 | 0.124903 |
| 142 | −0.23 | 0.063479 | −0.02717 | 0.033474 | −0.01228 |
| 144 | −0.002 | −0.00438 | 0.002177 | −0.00029 | −9.05E−06 |

FIG. 2 is a cross-sectional view of an optical system according to a second embodiment of the present invention. Table 4 illustrates optical characteristics of four lenses according to the second embodiment. In the second embodiment, a total EFL is 2.73 mm, a TTL is 3.75 mm, and an F value is 1.39. Tables 5 and 6 illustrate conic constants and aspheric coefficients for each lens constituting the optical system according to the second embodiment. Duplicate descriptions of the same contents as those of the first embodiment described with reference to FIG. 1 will be omitted.

Referring to FIG. 2, an optical system 200 includes a first lens 210, a second lens 220, a third lens 230, and a fourth lens 240 that are sequentially arranged from an object side to an image side. A filter 20 may be disposed above an image sensor 10, and the optical system 200 may be disposed above the filter 20.

Light reflected from the object sequentially passes through the first to fourth lenses 210 to 240 of the optical system 200 and the filter 20 and is then received by the image sensor 10.

The optical system 200 according to the second embodiment of the present invention may have an F value of 1.39, a TTL of 3.75, and a ratio (TTL/F value) of 2.69.

In the optical system 200 according to the second embodiment of the present invention, the first lens 210 has a positive (+) power. Accordingly, the first lens 210 may provide a part of the refractive power required by the optical system 200. An object-side surface 212 of the first lens 210 may be convex and an image-side surface 214 thereof may be concave. That is, the first lens 210 may have a meniscus shape. When the object-side surface 212 of the first lens 210 is convex, the refractive power of the first lens 210 may be enhanced.

In the optical system 200 according to the second embodiment of the present invention, the second lens 220 may have a positive (+) power, an object-side surface 222 of the second lens 220 may be convex, and an image-side surface 224 of the second lens 220 may be concave.

In the optical system 200 according to the second embodiment of the present invention, the third lens 230 may have a positive (+) power, an object-side surface 232 of the third lens 230 may be concave, and an image-side surface 234 of the third lens 230 may be convex. As described above, the third lens 230 may have a meniscus shape, and at least one of the object-side surface 232 and the image-side surface 234 of the third lens 230 may include at least one inflection point. Here, the thickness of the third lens 230 may be greater than the thickness of the second lens 220.

In the optical system 200 according to the second embodiment of the present invention, the fourth lens 240 may have a negative (−) power, an object-side surface 242 of the fourth lens 240 may be convex, and an image-side surface 244 of the fourth lens 240 may be concave. In addition, in the fourth lens 240, the absolute value of a radius of curvature of the object-side surface 242 may be greater than the absolute value of a radius of curvature of the image-side surface 244.

Here, at least one of the object-side surface 242 and the image-side surface 244 of the fourth lens 240 may include at least one inflection point at a position other than the intersection with an optical axis.

Here, a focal length F1 of the first lens 210 may be in a range of 0.5 mm to 10 mm, and the absolute value of a focal length of the third lens 230 may be greater than the absolute value of a focal length of the second lens 220. In the second embodiment, a ratio (F3/F1) of a focal length F3 of the third lens 230 to the focal length F1 of the first lens 210 may be 0.59.

Further, referring to Table 4, a third distance may be less than or equal to 0.2 mm, for example, 0.07 mm, and may be less than a first distance and a second distance.

Further, referring to Table 4, it may be seen that an index constant of the third lens 230 is 1.661 and the third lens 230 has the highest refractive index together with the fourth lens 240.

is 1.39. Tables 8 and 9 illustrate conic constants and aspheric coefficients for each lens constituting the optical system according to the third embodiment. Duplicate descriptions of the same contents as those of the first embodiment described with reference to FIG. 1 will be omitted.

Referring to FIG. 3, an optical system 300 includes a first lens 310, a second lens 320, a third lens 330, and a fourth lens 340 that are sequentially arranged from an object side to an image side. A filter 20 may be disposed above an image sensor 10, and the optical system 300 may be disposed above the filter 20.

Light reflected from the object sequentially passes through the first to fourth lenses 310 to 340 of the optical system 300 and the filter 20 and is then received by the image sensor 10.

The optical system 300 according to the third embodiment of the present invention may have an F value of 1.39, a TTL of 3.75, and a ratio (TTL/F value) of 2.69.

TABLE 4

| Lens No. | Lens surface No. | Radius of curvature R (mm) | Thickness (mm) | Index constant | Abbe number Vd | Focal length |
|---|---|---|---|---|---|---|
| First lens | 212 | 1.597986972 | 0.579582511 | 1.5442 | 56 | 3.490235657 |
| | 214 | 4.024543319 | 0.237303612 | | | |
| Second lens | 222 | 6.277167817 | 0.290959161 | 1.5442 | 56 | −39.31069672 |
| | 224 | 6.914424559 | 0.449720896 | | | |
| Third lens | 232 | −2.224245352 | 0.419753264 | 1.661 | 20.1 | 3.781541199 |
| | 234 | −1.039942266 | 0.07 | | | |
| Fourth lens | 242 | 1.729606257 | 0.426169902 | 1.661 | 20.1 | −22.12409968 |
| | 244 | 0.941460631 | 0.296510654 | | | |
| Filter | 22 | 1.00E+18 | 0.21 | filter | | |
| | 24 | 1.00E+18 | | | | |
| Image Sensor | 10 | 1.00E+18 | 0.77 | Image Sensor | | |

TABLE 5

| Lens surface No. | Conic constant K | A | B | C | D |
|---|---|---|---|---|---|
| 212 | −19.2614 | 0.476342 | −0.57989 | −0.76699 | 4.202803 |
| 214 | 9.391511 | −0.03418 | −0.12855 | 0.558849 | −1.6958 |
| 222 | 777.5035 | −0.24025 | −0.19134 | −1.53439 | 3.43385 |
| 224 | 175.234 | 0.289021 | −1.20887 | 1.962692 | −2.82352 |
| 232 | 1.885966 | 0.453127 | −0.41221 | −0.1444 | 0.281656 |
| 234 | −0.57991 | 0.027643 | −0.31419 | 0.729878 | −0.72109 |
| 242 | −3.1718 | −0.20625 | 0.02863 | −0.14416 | 0.309167 |
| 244 | −0.49174 | −0.27633 | 0.061103 | −0.02347 | 0.014383 |

TABLE 6

| Lens surface No. | E | F | G | H | J |
|---|---|---|---|---|---|
| 212 | −4.2386 | −1.90615 | 1.531808 | 6.598255 | −5.48295 |
| 214 | 0.822788 | 3.5607 | −6.15273 | 2.833881 | −0.08944 |
| 222 | −2.66624 | −0.01997 | −3.03678 | 4.414354 | 0.171669 |
| 224 | 2.736252 | −0.9793 | −1.68284 | 2.419841 | −0.95355 |
| 232 | 1.808093 | −3.58015 | 1.734831 | 0.728386 | −0.64042 |
| 234 | 0.031112 | 0.649824 | −0.22909 | −0.25381 | 0.124903 |
| 242 | −0.23 | 0.063479 | −0.02717 | 0.033474 | −0.01228 |
| 244 | −0.002 | −0.00438 | 0.002177 | −0.00029 | −9.05E−06 |

FIG. 3 is a cross-sectional view of an optical system according to a third embodiment of the present invention. Table 7 illustrates optical characteristics of four lenses according to the third embodiment. In the third embodiment, a total EFL is 2.73 mm, a TTL is 3.75 mm, and an F value In the optical system 300 according to the third embodiment of the present invention, the first lens 310 has a positive (+) power. Accordingly, the first lens 310 may provide a part of the refractive power required by the optical system 300. An object-side surface 312 of the first lens 310 may be convex and an image-side surface 314 thereof may be concave. That is, the first lens 310 may have a meniscus shape. When the object-side surface 312 of the first lens 310 is convex, the refractive power of the first lens 310 may be enhanced.

In the optical system 300 according to the third embodiment of the present invention, the second lens 320 may have a positive (+) power, an object-side surface 322 of the second lens 320 may be convex, and an image-side surface 324 of the second lens 320 may be concave.

In the optical system 300 according to the third embodiment of the present invention, the third lens 330 may have a positive (+) power, an object-side surface 332 of the third lens 330 may be concave, and an image-side surface 334 of the third lens 330 may be convex. As described above, the third lens 330 may have a meniscus shape, and at least one of the object-side surface 332 and the image-side surface 334 of the third lens 330 may include at least one inflection point. Here, the thickness of the third lens 330 may be greater than the thickness of the second lens 320.

In the optical system 300 according to the third embodiment of the present invention, the fourth lens 340 may have a negative (−) power, an object-side surface 342 of the fourth lens 340 may be convex, and an image-side surface 344 of the fourth lens 340 may be concave. In addition, in the fourth lens 340, the absolute value of a radius of curvature of the object-side surface 342 may be greater than the absolute value of a radius of curvature of the image-side surface 344. Here, at least one of the object-side surface 342 and the image-side surface 344 of the fourth lens 340 may include at least one inflection point at a position other than the intersection with an optical axis.

Here, a focal length F1 of the first lens 310 may be in a range of 0.5 mm to 10 mm, and the absolute value of a focal length of the third lens 330 may be greater than the absolute value of a focal length of the second lens 320. In the third embodiment, a ratio (F3/F1) of a focal length F3 of the third lens 330 to the focal length F1 of the first lens 310 may be 1.02.

Further, referring to Table 7, a third distance may be less than or equal to 0.2 mm, for example, 0.07 mm, and may be less than a first distance and a second distance.

Further, referring to Table 7, it may be seen that an index constant of the third lens 330 is 1.661 and the third lens 330 has the highest refractive index together with the fourth lens 340.

FIG. 4 is a cross-sectional view of an optical system according to a fourth embodiment of the present invention. Table 10 illustrates optical characteristics of four lenses according to the fourth embodiment. In the fourth embodiment, a total EFL is 3 mm, a TTL is 3.92 mm, and an F value is 1.39. Tables 11 and 12 illustrate conic constants and aspheric coefficients for each lens constituting the optical system according to the fourth embodiment. Duplicate descriptions of the same contents as those of the first embodiment described with reference to FIG. 1 will be omitted.

Referring to FIG. 4, an optical system 400 includes a first lens 410, a second lens 420, a third lens 430, and a fourth lens 440 that are sequentially arranged from an object side to an image side. A filter 20 may be disposed above an image sensor 10, and the optical system 400 may be disposed above the filter 20.

TABLE 7

| Lens No. | Lens surface No. | Radius of curvature R (mm) | Thickness (mm) | Index constant | Abbe number Vd | Focal length |
|---|---|---|---|---|---|---|
| First lens | 312 | 1.407893942 | 0.586980615 | 1.5442 | 56 | 4.089702634 |
|  | 314 | 3.355400813 | 0.354415435 |  |  |  |
| Second lens | 322 | 7.960620249 | 0.287118822 | 1.5442 | 56 | 37.50334757 |
|  | 324 | 13.00404648 | 0.263800912 |  |  |  |
| Third lens | 332 | −1.470620139 | 0.469572242 | 1.661 | 20.1 | 4.185718469 |
|  | 334 | −1.066019091 | 0.07 |  |  |  |
| Fourth lens | 342 | 1.519128232 | 0.434614718 | 1.661 | 20.1 | 9.201990562 |
|  | 344 | 1.072275343 | 0.2734942 |  |  |  |
| Filter | 22 | 1.00E+18 | 0.21 | Filter |  |  |
|  | 24 | 1.00E+18 |  |  |  |  |
| Image Sensor | 10 | 1.00E+18 | 0.8 | Image Sensor |  |  |

TABLE 8

| Lens surface No. | Conic constant K | A | B | C | D |
|---|---|---|---|---|---|
| 312 | −0.24544597 | 0.01448311 | −0.011725081 | 0.071941926 | −0.029579339 |
| 314 | 9.378082392 | −0.023216704 | −0.028734819 | −0.059572618 | 0.043524002 |
| 322 | 57.78729514 | −0.058448785 | −0.41360988 | 0.25434597 | −0.039689241 |
| 324 | 175.278782 | 0.094468749 | −0.328364798 | 0.135229936 | −0.039562236 |
| 332 | −5.187683377 | 0.18209163 | −0.326219031 | 0.166720156 | 0.262088319 |
| 334 | −1.555494572 | 0.106005879 | −0.185157918 | 0.078483194 | 0.05828106 |
| 342 | −4.201536473 | −0.161608417 | 0.010007312 | 0.021777805 | −0.002728858 |
| 344 | −5.471894053 | −0.08415643 | −0.001303781 | 0.010871375 | −0.003852592 |

TABLE 9

| Lens surface No. | E | F | G | H | J |
|---|---|---|---|---|---|
| 312 | −0.061409359 | −0.015560345 | 0.088371432 | 0.043994254 | −0.077126093 |
| 314 | 0.01913553 | −0.133913365 | 0.005635648 | 0.027229811 | −0.003635133 |
| 322 | −0.179948916 | −0.049896089 | −0.019110088 | 0.261824741 | 0.006732012 |
| 324 | 0.003687054 | 0.032727718 | −0.116269634 | −0.139841299 | 0.219990874 |
| 332 | −0.307702025 | −0.16243654 | 0.088861571 | 0.210682848 | −0.140586528 |
| 334 | 0.00478698 | −0.009133766 | −0.015006005 | −0.010519312 | 0.009886734 |
| 342 | −0.001633898 | −0.000827308 | 0.000731529 | −0.000144124 | 7.85E−06 |
| 344 | 0.000343293 | 5.39E−05 | −9.76E−06 | −1.04E−06 | 2.24E−07 |

Light reflected from the object sequentially passes through the first to fourth lenses 410 to 440 of the optical system 400 and the filter 20 and is then received by the image sensor 10.

The optical system 400 according to the fourth embodiment of the present invention may have an F value of 1.39, a TTL of 3.92, and a ratio (TTL/F value) of 3.

In the optical system 400 according to the fourth embodiment of the present invention, the first lens 410 has a positive (+) power. Accordingly, the first lens 410 may provide a part of the refractive power required by the optical system 400. An object-side surface 412 of the first lens 410 may be convex and an image-side surface 414 thereof may be concave. That is, the first lens 410 may have a meniscus shape. When the object-side surface 412 of the first lens 410 is convex, the refractive power of the first lens 410 may be enhanced.

In the optical system 400 according to the fourth embodiment of the present invention, the second lens 420 may have a negative (−) power, an object-side surface 422 of the second lens 420 may be concave, and an image-side surface 424 of the second lens 420 may be concave.

In the optical system 400 according to the fourth embodiment of the present invention, the third lens 430 may have a positive (+) power, an object-side surface 432 of the third lens 430 may be concave, and an image-side surface 434 of the third lens 430 may be convex. As described above, the third lens 430 may have a meniscus shape, and at least one of the object-side surface 432 and the image-side surface 434 of the third lens 430 may include at least one inflection point. Here, the thickness of the third lens 430 may be greater than the thickness of the second lens 420.

In the optical system 400 according to the fourth embodiment of the present invention, the fourth lens 440 may have a negative (−) power, an object-side surface 442 of the fourth lens 440 may be convex, and an image-side surface 444 of the fourth lens 440 may be concave. In addition, in the fourth lens 440, the absolute value of a radius of curvature of the object-side surface 442 may be greater than the absolute value of a radius of curvature of the image-side surface 444. Here, at least one of the object-side surface 442 and the image-side surface 444 of the fourth lens 440 may include at least one inflection point at a position other than the intersection with an optical axis.

Here, a focal length F1 of the first lens 410 may be in a range of 0.5 mm to 10 mm, and the absolute value of a focal length of the third lens 430 may be greater than the absolute value of a focal length of the second lens 420. In the fourth embodiment, a ratio (F3/F1) of a focal length F3 of the third lens 430 to the focal length F1 of the first lens 410 may be 1.23.

Further, referring to Table 10, a third distance may be less than or equal to 0.2 mm, for example, 0.1 mm, and may be equal to or less than a first distance and a second distance.

Further, referring to Table 10, it may be seen that the index constant of the third lens 430 is 1.661 and the third lens 430 has the highest refractive index together with the first lens 410 and the second lens 420.

TABLE 10

| Lens No. | Lens surface No. | Radius of curvature R (mm) | Thickness (mm) | Index constant | Abbe number Vd | Focal length |
|---|---|---|---|---|---|---|
| First lens | 412 | 1.375551892 | 0.787691509 | 1.661 | 20.4 | 3.29445969 |
|  | 414 | 3.096948959 | 0.412438984 |  |  |  |
| Second lens | 422 | −24.47116246 | 0.337767711 | 1.661 | 20.1 | −11.64026012 |
|  | 424 | 10.70966412 | 0.1 |  |  |  |
| Third lens | 432 | −3.095349677 | 0.431103362 | 1.661 | 20.1 | 4.058168449 |
|  | 434 | −1.485774043 | 0.1 |  |  |  |
| Fourth lens | 442 | 5.157483422 | 0.727670884 | 1.5442 | 56 | −6.529761925 |
|  | 444 | 1.983688945 | 0.12332755 |  |  |  |
| Filter | 22 |  | 0.21 | Filter |  |  |
|  | 24 |  |  |  |  |  |
| Image Sensor | 10 | 1.00E+18 | 0.89 | Image Sensor |  |  |

TABLE 11

| Lens surface No. | Conic constant K | A | B | C | D |
|---|---|---|---|---|---|
| 412 | −2.02876675 | 0.080615628 | 0.112371453 | −0.21737092 | 2.26E−01 |
| 414 | −7.146808879 | 0.071314041 | −0.189854711 | 0.763953651 | −1.12E+00 |
| 422 | −158.7181369 | −0.238439016 | −0.139349162 | 0.12886387 | −2.19E−01 |
| 424 | −900.0000042 | −0.000781497 | −0.424489007 | 0.57598003 | −8.07E−01 |
| 432 | −16.83959027 | 0.078273616 | −0.08335023 | 0.151699387 | −3.81E−01 |
| 434 | 0.889977924 | −0.149069257 | 0.633528543 | −0.502433928 | 2.01E−01 |
| 442 | −183.9650263 | −0.515026369 | 0.9675072 | −1.358669563 | 3.83E−01 |
| 444 | −24.50818555 | −0.053689006 | −0.037193388 | 0.022773193 | −1.48E−03 |

TABLE 12

| Lens surface No. | E | F | G | H | J |
|---|---|---|---|---|---|
| 412 | −2.63E−02 | −0.073431595 | −0.003387712 | 0.046820099 | −0.013354319 |
| 414 | −1.19E−01 | 1.699733475 | −0.650989387 | −0.940486616 | 0.494693812 |
| 422 | −6.45E−02 | 1.081392082 | −0.89723209 | −0.577273465 | 0.709396702 |
| 424 | 5.01E−01 | 0.109535711 | 0.289997828 | −0.738253682 | 0.435342758 |
| 432 | 2.01E−01 | 0.657349795 | −1.364073752 | 1.291783372 | −0.490240433 |
| 434 | 1.46E−01 | −0.059799888 | −0.142892554 | 0.097986738 | 0.011512391 |
| 442 | 1.50E+00 | −1.29605996 | −1.187788463 | 1.99010691 | −0.710745599 |
| 444 | −2.84E−03 | −7.49E−06 | −0.000386441 | 0.000576506 | −0.000139511 |

FIG. 5 is a cross-sectional view of an optical system according to a fifth embodiment of the present invention. Table 13 illustrates optical characteristics of four lenses according to the fifth embodiment. In the fifth embodiment, a total EFL is 2.305 mm, a TTL is 3.7 mm, and an F value is 1.39. Tables 14 and 15 illustrate conic constants and aspheric coefficients for each lens constituting the optical system according to the fifth embodiment. Duplicate descriptions of the same contents as those of the first embodiment described with reference to FIG. 1 will be omitted.

Referring to FIG. 5, an optical system 500 includes a first lens 510, a second lens 520, a third lens 530, and a fourth lens 540 that are sequentially arranged from an object side to an image side. A filter 20 may be disposed above an image sensor 10, and the optical system 500 may be disposed above the filter 20.

Light reflected from the object sequentially passes through the first to fourth lenses 510 to 540 of the optical system 500 and the filter 20 and is then received by the image sensor 10.

The optical system 500 according to the fifth embodiment of the present invention may have an F value of 1.39, a TTL of 3.7, and a ratio (TTL/F value) of 2.66.

In the optical system 500 according to the fifth embodiment of the present invention, the first lens 510 has a positive (+) power. Accordingly, the first lens 510 may provide a part of the refractive power required by the optical system 500. An object-side surface 512 of the first lens 510 may be convex and an image-side surface 514 thereof may be concave. That is, the first lens 510 may have a meniscus shape. When the object-side surface 512 of the first lens 510 is convex, the refractive power of the first lens 510 may be enhanced.

In the optical system 500 according to the fifth embodiment of the present invention, the second lens 520 may have a negative (−) power, an object-side surface 522 of the second lens 520 may be concave, and an image-side surface 524 of the second lens 520 may be convex.

In the optical system 500 according to the fifth embodiment of the present invention, the third lens 530 may have a positive (+) power, an object-side surface 532 of the third lens 530 may be concave, and an image-side surface 534 of the third lens 530 may be convex. As described above, the third lens 530 may have a meniscus shape, and at least one of the object-side surface 532 and the image-side surface 534 of the third lens 530 may include at least one inflection point. Here, the thickness of the third lens 530 may be greater than the thickness of the second lens 520.

In the optical system 500 according to the fifth embodiment of the present invention, the fourth lens 540 may have a negative (−) power, an object-side surface 542 of the fourth lens 540 may be convex, and an image-side surface 544 of the fourth lens 540 may be concave. In addition, in the fourth lens 540, the absolute value of a radius of curvature of the object-side surface 542 may be greater than the absolute value of a radius of curvature of the image-side surface 544. Here, at least one of the object-side surface 542 and the image-side surface 544 of the fourth lens 540 may include at least one inflection point at a position other than the intersection with an optical axis.

Here, a focal length F1 of the first lens 510 may be in a range of 0.5 mm to 10 mm, and the absolute value of a focal length of the third lens 530 may be greater than the absolute value of a focal length of the second lens 520. In the fifth embodiment, a ratio (F3/F1) of a focal length F3 of the third lens 530 to the focal length F1 of the first lens 510 may be 0.61.

Further, referring to Table 13, a third distance may be less than or equal to 0.2 mm, for example, 0.1 mm, and may be less than a first distance and a second distance.

Further, referring to Table 13, it may be seen that an index constant of the third lens 530 is 1.661 and the third lens 530 has the highest refractive index together with the fourth lens 540.

TABLE 13

| Lens No. | Lens surface No. | Radius of curvature R (mm) | Thickness (mm) | Index constant | Abbe number Vd | Focal length |
|---|---|---|---|---|---|---|
| First lens | 512 | 1.517448169 | 0.7 | 1.5442 | 56 | 3.467311368 |
|  | 514 | 6.900859681 | 0.266075315 |  |  |  |
| Second lens | 522 | −15.38413544 | 0.25 | 1.5442 | 56 | −43.85131361 |
|  | 524 | −44.6826148 | 0.167674283 |  |  |  |
| Third lens | 532 | −2.121650998 | 0.7 | 1.661 | 20.4 | 2.128591561 |
|  | 534 | −0.934030502 | 0.1 |  |  |  |
| Fourth lens | 542 | 1.826329622 | 0.419546011 | 1.661 | 20.4 | −3.628768665 |
|  | 544 | 0.929368638 | 0.34570439 |  |  |  |

TABLE 13-continued

| Lens No. | Lens surface No. | Radius of curvature R (mm) | Thickness (mm) | Index constant | Abbe number Vd | Focal length |
|---|---|---|---|---|---|---|
| Filter | 22 | | 0.21 | Filter | | |
| | 24 | | | | | |
| Image Sensor | 10 | 1.00E+18 | 0.54 | Image Sensor | | |

TABLE 14

| Lens surface No. | Conic constant K | A | B | C | D |
|---|---|---|---|---|---|
| 512 | −3.085272899 | 0.046686781 | 0.295527392 | −0.812455018 | 9.63E−01 |
| 514 | 9.378632495 | −0.016776937 | −0.173513371 | 0.044159898 | 5.92E−01 |
| 522 | −285.0066055 | −0.30194991 | −0.031816548 | −0.05545418 | −8.40E−01 |
| 524 | 175.2339944 | 0.019640686 | −0.763350477 | 3.562306706 | −7.65E+00 |
| 532 | 0.921407393 | 0.211578909 | −0.226802397 | 0.061627153 | 7.33E−01 |
| 534 | −0.538757855 | 0.357631728 | −0.75177997 | 1.230110188 | −7.93E−01 |
| 542 | −4.240137391 | −0.198342043 | 0.084267495 | −0.121931988 | 1.67E−01 |
| 544 | −4.408450288 | −0.131917052 | 0.06491616 | −0.057198457 | 4.36E−02 |

TABLE 15

| Lens surface No. | E | F | G | H | J |
|---|---|---|---|---|---|
| 512 | −1.66E−01 | −6.71E−01 | 0.023523736 | 1.105339413 | −0.788563946 |
| 514 | −2.04E+00 | 4.21E−01 | 4.049936296 | −3.57899275 | −0.089521334 |
| 522 | −2.24E+00 | 4.97E+00 | 4.489829967 | −8.818463239 | 0.147639819 |
| 524 | 4.32E+00 | 3.48E+00 | −1.793175975 | −4.416217225 | 2.940788272 |
| 532 | 2.96E−01 | −4.93E+00 | 2.902464898 | 4.451085694 | −3.63E+00 |
| 534 | −2.43E−01 | 5.60E−01 | −0.049451544 | −0.259467354 | 0.120890047 |
| 542 | −1.10E−01 | 2.34E−02 | −0.003296859 | 0.005097161 | −0.001505302 |
| 544 | −1.85E−02 | 3.22E−04 | 0.002361321 | −0.000716073 | 6.76E−05 |

FIGS. 6 to 10 are graphs each obtained by measuring longitudinal spherical aberration, astigmatic field curves, and distortion of each of the optical systems according to the first to fifth embodiments.

FIG. 6A is a graph obtained by measuring longitudinal spherical aberration for light having wavelengths of 840 nm, 850 nm, and 860 nm in the optical system according to the first embodiment, FIG. 6B is a graph obtained by measuring astigmatic field curves for the light having wavelengths of 840 nm, 850 nm, and 860 nm in the optical system according to the first embodiment, and FIG. 6C is a graph obtained by measuring distortion for the light having wavelengths of 840 nm, 850 nm, and 860 nm in the optical system according to the first embodiment.

FIG. 7A is a graph obtained by measuring longitudinal spherical aberration for light having wavelengths of 840 nm, 850 nm, and 860 nm in the optical system according to the second embodiment, FIG. 7B is a graph obtained by measuring astigmatic field curves for the light having wavelengths of 840 nm, 850 nm, and 860 nm in the optical system according to the second embodiment, and FIG. 7C is a graph obtained by measuring distortion for the light having wavelengths of 840 nm, 850 nm, and 860 nm in the optical system according to the second embodiment.

FIG. 8A is a graph obtained by measuring longitudinal spherical aberration for light having wavelengths of 840 nm, 850 nm, and 860 nm in the optical system according to the third embodiment, FIG. 8B is a graph obtained by measuring astigmatic field curves for the light having wavelengths of 840 nm, 850 nm, and 860 nm in the optical system according to the third embodiment, and FIG. 8C is a graph obtained by measuring distortion for the light having wavelengths of 840 nm, 850 nm, and 860 nm in the optical system according to the third embodiment.

FIG. 9A is a graph obtained by measuring longitudinal spherical aberration for light having wavelengths of 840 nm, 850 nm, and 860 nm in the optical system according to the fourth embodiment, FIG. 9B is a graph obtained by measuring astigmatic field curves for the light having wavelengths of 840 nm, 850 nm, and 860 nm in the optical system according to the fourth embodiment, and FIG. 9C is a graph obtained by measuring distortion for the light having wavelengths of 840 nm, 850 nm, and 860 nm in the optical system according to the fourth embodiment.

FIG. 10A is a graph obtained by measuring longitudinal spherical aberration for light having wavelengths of 840 nm, 850 nm, and 860 nm in the optical system according to the fifth embodiment, FIG. 10B is a graph obtained by measuring astigmatic field curves for the light having wavelengths of 840 nm, 850 nm, and 860 nm in the optical system according to the fifth embodiment, and FIG. 10C is a graph obtained by measuring distortion for the light having wavelengths of 840 nm, 850 nm, and 860 nm in the optical system according to the fifth embodiment.

The longitudinal spherical aberration shows longitudinal spherical aberration depending on each wavelength, the astigmatic field curve shows aberration characteristics of a tangential plane and a sagittal plane according to an image surface height, and the distortion shows a degree of distortion according to the image surface height. Referring to FIGS. 6 to 10, it may be seen that the longitudinal spherical aberration is within a range of −0.08 mm to 0.08 mm regardless of the wavelength, and the astigmatic field curves are within a range of −0.2 mm to 0.2 mm regardless of the wavelength, and the distortion is within a range of −2% to 2% regardless of the wavelength.

Accordingly, it may be seen that the optical system according to the embodiment of the present invention has excellent aberration characteristics.

Meanwhile, the optical system according to the embodiment of the present invention may be applied to a camera module. FIG. 11 is a cross-sectional view of a camera module to which the optical system according to one embodiment of the present invention is applied.

Referring to FIG. 11, a camera module 1100 includes a lens assembly 1110, an image sensor 1120, and a printed circuit board 1130. Here, the lens assembly 1110 may include an optical system 1112, a lens barrel 1114, a lens holder 1116, and an IR filter 1118. The optical system 1112 may correspond to the optical systems according to the embodiments of the present invention illustrated with reference to FIGS. 1 to 5, and the IR filter 1118 may correspond to the filter 20 illustrated in FIGS. 1 to 5. The image sensor 1120 may correspond to the image sensor 10 illustrated in FIGS. 1 to 5.

A plurality of lenses constituting the optical system 1112 may be aligned with respect to a central axis. Here, the central axis may be the same as the optical axis of the optical system.

The lens barrel 1114 is coupled to the lens holder 1116 and may be provided with a space for accommodating the lenses therein. The lens barrel 1114 may be rotationally coupled with the plurality of lenses constituting the optical system 1112, but this is exemplary and the lens barrel 1114 may be coupled using another method such as a method using an adhesive (for example, an adhesive resin such as epoxy and the like).

The lens holder 1116 may be coupled to the lens barrel 1114 to support the lens barrel 1114 and may be coupled to the printed circuit board 1130 on which the image sensor 1120 is mounted. A space in which the IR filter 1118 may be attached to a lower part of the lens barrel 1114 may be formed by the lens holder 1116. A spiral pattern may be formed on an inner circumferential surface of the lens holder 1116, and similarly, the lens holder 1116 may be rotatably coupled to the lens barrel 1114 having an outer circumferential surface on which a spiral pattern is formed. However, this is merely exemplary, and the lens holder 1116 and the lens barrel 1114 may be coupled to each other using an adhesive or may be integrally formed.

The lens holder 1116 may be divided into an upper holder 1116-1 coupled to the lens barrel 1114 and a lower holder 1116-2 coupled to the printed circuit board 1130 on which the image sensor 1120 is mounted, and the upper holder 1116-1 and the lower holder 1116-2 may be integrally formed, may be formed in a structure separated from each other and then fastened or coupled to each other, or may have a structure separated and spaced apart from each other. Here, the diameter of the upper holder 1116-1 may be formed to be smaller than the diameter of the lower holder 1116-2.

Such a camera module may be a camera module that extracts a depth map.

FIG. 12 illustrates a block diagram of a camera module that extracts a depth map according to one embodiment of the present invention.

Referring to FIG. 12, a camera module 1200 includes a light output unit 1210, a lens unit 1220, an image sensor 1230, a tilting unit 1240, and an image processing unit 1250. The camera module 1200 according to the embodiment of the present invention extracts a depth map using a time of flight (ToF) function and thus may be used interchangeably with a ToF camera device or a ToF camera module in the present specification.

The light output unit 1210 generates an output light signal and irradiates the generated output light signal to an object. Here, the light output unit 1210 may generate and output the output light signal in the form of a pulse wave or a continuous wave. The continuous wave may be in the form of a sine wave or a square wave. By generating the output light signal in the form of a pulse wave or a continuous wave, the camera module 1200 may detect a phase difference between the output light signal output from the light output unit 1210 and an input light signal input to the camera module 1200 after being reflected from the object. In the present specification, output light may refer to light output from the light output unit 1210 and incident on the object, and input light may refer to light which is output from the light output unit 1210, reaches the object, is reflected from the object, and then input to the camera device 1200. From the perspective of the object, the output light may be incident light and the input light may be reflected light.

The light output unit 1210 irradiates the generated output light signal to the object for a predetermined exposure period. Here, the exposure period means one frame period. When a plurality of frames are generated, a preset exposure period is repeated. For example, when the camera device 1200 captures an image of the object at 20 frames per second (FPS), the exposure period becomes ¹⁄₂₀ sec. Also, when 100 frames are generated, the exposure period may be repeated 100 times.

The light output unit 1210 may generate a plurality of output light signals having different frequencies. The light output unit 1210 may sequentially and repeatedly generate the plurality of output light signals having different frequencies. Alternatively, the light output unit 1210 may simultaneously generate the plurality of output light signals having different frequencies.

To this end, the light output unit 1210 may include a light source 1212 configured to generate light and a light modulating unit 1214 configured to modulate the light.

First, the light source 1212 generates light. The light generated by the light source 1212 may be an infrared light having a wavelength of 770 to 3000 nm or may be a visible light having a wavelength of 380 to 770 nm. The light source 1212 may use a light-emitting diode (LED), and may have a shape in which a plurality of light-emitting diodes are arranged in a predetermined pattern. In addition, the light source 1212 may also include an organic light-emitting diode (OLED) or a laser diode (LD). Alternatively, the light source 1212 may also include a vertical cavity surface emitting laser (VCSEL). The VCSEL is a type of laser diode that converts an electrical signal into a light signal and may use a wavelength of about 800 to 1000 nm, for example, about 850 nm or about 940 nm.

The light source 1212 is repeatedly turned on/off at a predetermined time interval to generate the output light signal in the form of a pulse wave or a continuous wave. The predetermined time interval may be the frequency of the output light signal. Turning the light source on/off may be controlled by the light modulating unit 1214.

The light modulating unit 1214 controls turning the light source 1212 on/off so that the light source 1212 generates the output light signal in the form of a continuous wave or a pulse wave. The light modulating unit 1214 may control the light source 1212 to generate the output light signal in the form of a continuous wave or a pulse wave through frequency modulation, pulse modulation, or the like.

Meanwhile, the lens unit 1220 collects the input light signal reflected from the object and transmits the collected light signal to the image sensor 1230. Here, the lens unit 1220 may correspond to the lens assembly 1110 illustrated in FIG. 11 and may include an optical system and an IR filter. Here, the optical system may be the optical systems according to the embodiments of the present invention illustrated with reference to FIGS. 1 to 5, and the IR filter may be the filter 20 illustrated in FIGS. 1 to 5.

The image sensor 1230 generates an electrical signal using the input light signal collected by the lens unit 1220.

The image sensor 1230 may be synchronized with a cycle of turning the light output unit 1210 on/off to detect the input light signal. Specifically, the image sensor 1230 may detect light in an in-phase and out-phase with the output light signal output from the light output unit 1210. That is, the image sensor 1230 may repeatedly perform operations of absorbing the light input signal at the time at which the light source is turned on and absorbing the light input signal at the time at which the light source is turned off.

Next, the image sensor 1230 may generate an electrical signal corresponding to each of a plurality of reference signals having different phase differences using the reference signals. A frequency of the reference signals may be set to be equal to a frequency of the output light signal output from the light output unit 1210. Accordingly, when the light output unit 1210 generates the output light signals with a plurality of frequencies, the image sensor 1230 generates electrical signals using the plurality of reference signals corresponding to the frequencies, respectively. The electrical signal may include information related to voltage or quantity of electric charge corresponding to each reference signal.

FIG. 13 is a view for describing a process of generating the electrical signals according to the embodiment of the present invention. As illustrated in FIG. 13, according to the embodiment of the present invention, four reference signals C1 to C4 may be provided. The reference signals C1 to C4 have the same frequency as the output light signal, that is, an incident light signal from the perspective of the object, but may have a phase difference of 90° from each other. One reference signal C1 of the four reference signals may have the same phase as the output light signal. The input light signal, that is, a reflected light signal from the perspective of the object, is phase-delayed by as much as the distance at which the output light signal is reflected and then returned after being incident on the object. The image sensor 1230 mixes the input light signal and each of the reference signals. Then, the image sensor 1230 may generate an electrical signal corresponding to a shaded portion in FIG. 13 for each reference signal.

As another embodiment, when output light signals are generated with a plurality of frequencies during an exposure time, the image sensor 1230 absorbs input light signals having the plurality of frequencies. For example, it is assumed that the output light signals are generated with frequencies f1 and f2, and the plurality of reference signals have a phase difference of 90° from each other. Then, the input light signals also have frequencies f1 and f2, and thus four electrical signals may be generated through an input light signal having a frequency of f1 and four reference signals corresponding to the input light signal. In addition, four electrical signals may be generated through an input light signal having a frequency of f2 and four reference signals corresponding to the input light signal. Accordingly, a total of eight electrical signals may be generated.

The image sensor 1230 may have a structure in which a plurality of pixels are arranged in a grid shape. The image sensor 1230 may be a complementary metal-oxide semiconductor (CMOS) image sensor or may be a charge-coupled device (CCD) image sensor. In addition, the image sensor 1230 may include a ToF sensor that receives IR light reflected from a subject and measures a distance using a time or phase difference.

The image processing unit 1250 calculates a phase difference between the output light and the input light using the electrical signal received from the image sensor 1230 and calculates a distance between the object and the camera module 1200 using the phase difference.

Specifically, the image processing unit 1250 may calculate the phase difference between the output light and the input light using the information on the quantity of electric charge of the electrical signal.

As described above, four electrical signals may be generated for each frequency of the output light signal. Accordingly, the image processing unit 1250 may calculate a phase difference td between the output light signal and the input light signal using Equation 1 below.

$$t_d = \arctan\left(\frac{Q_3 - Q_4}{Q_1 - Q_2}\right) \quad \text{[Equation 1]}$$

where $Q_1$ to $Q_4$ are quantities of electric charge of the four electrical signals, respectively. $Q_1$ is the quantity of electric charge of the electrical signal corresponding to the reference signal having the same phase as the output light signal. $Q_2$ is the quantity of electric charge of the electrical signal corresponding to the reference signal whose phase is delayed by 180° from the output light signal. $Q_3$ is the quantity of electric charge of the electrical signal corresponding to the reference signal whose phase is delayed by 90° from the output light signal. $Q_4$ is the quantity of electric charge of the electrical signal corresponding to the reference signal whose phase is delayed by 270° degrees from the output light signal.

Then, the image processing unit 1250 may calculate the distance between the object and the camera module 1200 using the phase difference between the output light signal and the input light signal. At this point, the image processing unit 1250 may calculate a distance d between the object and the camera module 1200 using Equation 2 below.

$$d = \frac{c}{2f} \frac{t_d}{2\pi} \quad \text{[Equation 2]}$$

where c is the speed of light, and f is the frequency of the output light.

FIG. 14 is a simplified view of an example of a method of obtaining a ToF-IR image or a depth image using four phase images.

Referring to FIG. 14, a depth image 1 may be obtained by sequentially extracting a phase image 1 for phase 0°, a phase image 2 for phase 90°, a phase image 3 for phase 180°, and a phase image 4 for phase 270°, and a depth image 2 may be obtained by sequentially extracting a phase image 5 for phase 0°, a phase image 6 for phase 90°, a phase image 7 for phase 180°, and a phase image 8 for phase 270°.

Meanwhile, in order to increase the resolution of the depth images, the camera module according to the embodiment of the present invention may use a super resolution (SR) technique. The SR technique is a technique of obtaining a high-resolution image from a plurality of low-resolution images, and the mathematical model of the SR technique may be represented by Equation 3 below.

$$y_k = D_k B_k M_k x + n_k$$ [Equation 3]

where $1 \leq k \leq p$, p represents the number of the low-resolution images, $y_k$ represents the low-resolution image ($=[y_{k,1}, y_{k,2}, \ldots, y_{k,M}]^T$; where $M=N_1*N_2$), $D_k$ represents a down-sampling matrix, $B_k$ represents an optical blur matrix, $M_k$ represents an image warping matrix, x represents the high-resolution image ($=[x_1, x_2, \ldots, x_N]^T$; where $N=L_1 N_1 * L_2 N_2$), and $n_k$ represents noise. That is, according to the SR technique, the inverse function of estimated resolution degradation elements is applied to $y_k$ to estimate x. The SR technique may be mainly divided into a statistical method and a multi-frame method, and the multi-frame method may be mainly divided into a space-division method and a time-division method.

In order to apply the SR technique to extract the depth map, the image processing unit 1250 may generate a plurality of low-resolution subframes using the electrical signals received from the image sensor 1230 and then extract a plurality of low-resolution depth maps using the plurality of low-resolution sub-frames. In addition, a high-resolution depth map may be extracted by rearranging pixel values of the plurality of low-resolution depth maps.

Here, the high resolution is a relative meaning that indicates a resolution higher than the low resolution.

Here, the subframe may refer to image data generated from the electrical signal corresponding to one exposure period and one reference signal. For example, when electrical signals are generated using eight reference signals in one image frame, i.e., a first exposure period, eight subframes may be generated and one start frame may be additionally generated. In the present specification, the term "subframe" may be used interchangeably with the terms such as "image data," "subframe image data," and the like.

Alternatively, in order to apply the SR technique according to the embodiment of the present invention to extract the depth map, the image processing unit 1250 may generate a plurality of low-resolution subframes using the electrical signals received from the image sensor 1230 and then rearrange pixel values of the low-resolution subframes to generate a plurality of high-resolution subframes. In addition, the high-resolution subframes may be used to extract a high-resolution depth map.

To this end, a pixel shift technique may be used. That is, data for multiple images shifted by as much as the subpixels is obtained per subframe using the pixel shift technique, and then the SR technique is applied to each subframe to obtain data for a plurality of high-resolution subframe images, and the data may be used to extract high-resolution depth images. For the pixel shift, the camera device 1200 according to the embodiment of the present invention further includes the tilting unit 1240.

Referring to FIG. 12 again, the tilting unit 1240 changes a light path for at least one of the output light signal and the input light signal in the unit of subpixels of the image sensor 1230. Here, the subpixel may be a unit greater than zero pixels and smaller than one pixel.

The tilting unit 1240 changes a light path for at least one of the output light signal and the input light signal for each image frame. As described above, one image frame may be generated for each exposure period. Accordingly, when one exposure period ends, the tilting unit 1240 changes the light path for at least one of the output light signal or the input light signal.

The tilting unit 1240 changes the light path for at least one of the output light signal or the input light signal by as much as the subpixel unit on the basis of the image sensor 1230. Here, the tilting unit 1240 changes the light path for at least one of the output light signal or the input light signal in one of upward, downward, leftward, and rightward directions on the basis of the current light path.

FIG. 15A is a view for describing the light path of the input light signal changed by the tilting unit, and FIG. 15B is a view for describing the interpolation of input light data by moving a pixel in the unit of subpixels in the image sensor.

In FIG. 15A, the portion indicated by a solid line represents a current light path of the input light signal, and the portion indicated by a dotted line represents a changed light path. When the exposure period corresponding to the current light path is ended, the tilting unit 1240 may change the light path of the input light signal to be like the dotted line. The path of the input light signal is then shifted by as much as the subpixels from the current light path. For example, when the tilting unit 1240 tilts the current light path 0.173° to the right as shown in FIG. 15A, the input light signal incident on the image sensor 1230 may move rightward by as much as the subpixels.

According to the embodiment of the present invention, the tilting unit 1240 may change the light path of the input light signal in a clockwise direction from a reference position. For example, as illustrated in FIG. 15B, after a first exposure period is ended, in a second exposure period, the tilting unit 1240 moves the light path of the input light signal in the rightward direction by as much as the subpixels on the basis of the image sensor 1230. In addition, in a third exposure period, the tilting unit 1240 moves the light path of the input light signal in the rightward direction by as much as the subpixels on the basis of the image sensor 1230. In addition, in a fourth exposure period, the tilting unit 1240 moves the light path of the input light signal in the rightward direction by as much as the subpixels on the basis of the image sensor 1230. In addition, in a fifth exposure period, the tilting unit 1240 moves the light path of the input light signal in a downward direction by as much as the subpixels on the basis of the image sensor 1230. In this way, the tilting unit 1240 may move the light path of the input light signal in the unit of subpixels with a plurality of exposure periods. This may be similarly applied to shifting the light path of the output light signal, and thus detailed description thereof will be omitted. In addition, the pattern in which the light path is changed in a clockwise direction is merely an example, and the light path may be changed in a counterclockwise direction. As described above, when the tilting unit 1240 moves the light path of the input light signal in the unit of subpixels, the information may be interpolated in the unit of subpixels, and thus it is possible to maintain a high resolution even when four phase signals are simultaneously received within one period.

Here, as shown in FIG. 15A, according to one embodiment, the tilting unit 1240 shifts the input light signal by controlling the slope of the IR filter and thus may obtain data shifted by as much as the subpixels. To this end, the tilting unit 1240 may include an actuator connected directly or indirectly to the IR filter, and the actuator may include at least one of micro electro mechanical systems (MEMS), voice coil motor (VCM), and piezoelectric elements.

However, the present invention is not limited thereto, and the method of interpolating the input light data by moving the pixel in the unit of subpixels in the image sensor described in FIG. 15B may be realized as software.

The camera module according to the embodiment of the present invention may be embedded in a portable terminal such as a smartphone, a tablet personal computer (PC), a laptop computer, a personal digital assistant (PDA), and the like.

Although the embodiments have been described above, the embodiments are merely examples and not intended to limit the present invention, and it may be seen that a variety of modifications and applications not described above may be made by one of ordinary skill in the art without departing from the essential features of the embodiments. For example, the elements described in the embodiments may be realized while being modified. Further, differences related to the modifications and the applications should be included in the scope of the present invention as defined in the claims.

The invention claimed is:

1. An optical system comprising:
a plurality of lenses including a first lens, a second lens, a third lens, and a fourth lens sequentially arranged from an object side to an image side,
wherein among a first refractive index of the first lens, a second refractive index of the second lens, a third refractive index of the third lens, and a fourth refractive index of the fourth lens, the third refractive index and the fourth refractive index are higher than the first refractive index and the second refractive index,
wherein the second lens includes a concave object-side surface and a concave image-side surface,
wherein the third refractive index is highest among respective refractive indexes of the plurality of lenses, and
wherein a ratio (F3/F1) of a focal length (F3) of the third lens to a focal length (F1) of the first lens is in a range of 0.5 to 1.5.

2. The optical system of claim 1, wherein the first lens and the third lens each have a positive power.

3. The optical system of claim 1, wherein the second lens and the fourth lens each have a negative power.

4. The optical system of claim 1, wherein:
the first lens includes a convex object-side surface and a concave image-side surface,
the third lens includes a concave object-side surface and a convex image-side surface, and
the fourth lens includes a convex object-side surface and a concave image-side surface.

5. The optical system of claim 1, wherein the first refractive index and the second refractive index are the same.

6. The optical system of claim 1, wherein among a first distance between an image-side surface of the first lens and the concave object-side surface of the second lens, a second distance between the concave image-side surface of the second lens and an object-side surface of the third lens, and a third distance between an image-side surface of the third lens and an object-side surface of the fourth lens, the third distance is the shortest and is 0.1 mm or less.

7. The optical system of claim 1, wherein Abbe numbers of the first lens and the second lens are greater than Abbe numbers of the third lens and the fourth lens.

8. The optical system of claim 1, wherein at least one of an object-side surface and an image-side surface of the fourth lens and at least one of an object-side surface and an image-side surface of the third lens each include at least one inflection point.

9. The optical system of claim 1, wherein a thickness of the third lens is greater than a thickness of the second lens.

10. The optical system of claim 1, wherein an absolute value of a radius of curvature of an object-side surface of the fourth lens is greater than an absolute value of a radius of curvature of an image-side surface of the fourth lens.

11. The optical system of claim 1, wherein an absolute value of the focal length of the third lens is greater than an absolute value of a focal length of the second lens.

12. The optical system of claim 1, comprising the first to fourth lenses.

13. A camera module comprising:
an image sensor;
a filter disposed above the image sensor; and
an optical system disposed above the filter,
wherein the optical system includes a plurality of lenses, the plurality of lenses including a first lens, a second lens, a third lens, and a fourth lens sequentially arranged from an object side to an image side,
wherein among a first refractive index of the first lens, a second refractive index of the second lens, a third refractive index of the third lens, and a fourth refractive index of the fourth lens, the third refractive index and the fourth refractive index are higher than the first refractive index and the second refractive index,
wherein the second lens includes a concave object-side surface and a concave image-side surface,
wherein the third refractive index is highest among respective refractive indexes of the plurality of lenses, and
wherein a ratio (F3/F1) of a focal length (F3) of the third lens to a focal length (F1) of the first lens is in a range of 0.5 to 1.5.

14. The camera module of claim 13, wherein the first lens and the third lens each have a positive power.

15. The camera module of claim 13, wherein the second lens and the fourth lens each have a negative power.

16. The camera module of claim 13, wherein:
the first lens includes a convex object-side surface and a concave image-side surface,
the third lens includes a concave object-side surface and a convex image-side surface, and
the fourth lens includes a convex object-side surface and a concave image-side surface.

17. The camera module of claim 13, further comprising:
a light output unit configured to output light to an object; and
an image processing unit configured to extract a depth map of the object using the light that is output from the light output unit, reflected from the object, and received by the image sensor through the optical system and the filter,
wherein the image processing unit extracts the depth map of the object using a phase difference between the light output from the light output unit and the light received by the image sensor.

18. The camera module of claim 17, wherein:
the filter is tilted with a predetermined rule, and
a path of light received by the image sensor is shifted by the predetermined rule according to the tilting of the filter.

* * * * *